United States Patent
Roe et al.

(10) Patent No.: US 12,545,842 B2
(45) Date of Patent: *Feb. 10, 2026

(54) CHEMICAL COMPOSITIONS AND METHODS OF USING SAME FOR REMEDIATING SULFUR-CONTAINING COMPOSITIONS AND OTHER CONTAMINANTS IN FLUIDS

(71) Applicant: GAPS Technology, LLC, Slidell, LA (US)

(72) Inventors: Cliffton Lee Roe, Harrison Township, MI (US); Linda Schweitzer, Rochester Hills, MI (US)

(73) Assignee: Gaps Technology, LLC, Slidell, LA (US)

( * ) Notice: Subject to any disclaimer, the term of this patent is extended or adjusted under 35 U.S.C. 154(b) by 94 days.

This patent is subject to a terminal disclaimer.

(21) Appl. No.: 18/382,932

(22) Filed: Oct. 23, 2023

(65) Prior Publication Data

US 2024/0067887 A1 Feb. 29, 2024

Related U.S. Application Data

(60) Division of application No. 17/857,084, filed on Jul. 4, 2022, now abandoned, which is a continuation of
(Continued)

(51) Int. Cl.
*C10G 29/22* (2006.01)
*B01D 53/34* (2006.01)
(Continued)

(52) U.S. Cl.
CPC .......... *C10G 29/22* (2013.01); *B01D 53/526* (2013.01); *B01D 53/62* (2013.01); *B01D 53/78* (2013.01);
(Continued)

(58) Field of Classification Search
None
See application file for complete search history.

(56) References Cited

U.S. PATENT DOCUMENTS

| 2,592,523 A | 4/1952 | Ayers et al. |
| 3,262,753 A | 7/1966 | Urano et al. |

(Continued)

FOREIGN PATENT DOCUMENTS

| EP | 0 432 858 A1 | 6/1991 |
| WO | 2019/036731 A2 | 2/2019 |
| WO | 2019/209379 A1 | 10/2019 |

OTHER PUBLICATIONS

Shahrak, M.N. et al., "Removal of Hydrogen Sulfide from Hydrocarbon Liquids Using a Caustic Solution", article in Energy Sources Part A Recovery Utilization and Environmental Effects: Mar. 2015, pp. 791-798.
(Continued)

*Primary Examiner* — Tam M Nguyen
(74) *Attorney, Agent, or Firm* — Carrier, Shende & Associates P.C.; Joseph P. Carrier; Fulchand P. Shende

(57) ABSTRACT

A treatment process for remediating contaminants in a mixture of contaminated fluids, including at least one liquid fluid and at least one gaseous fluid, includes the steps of: preparing a liquid treatment composition containing at least 80 volume % of an aqueous solution containing at least one hydroxide compound at a collective concentration of 35-55 weight percent, and at least one of fulvic acid and humic acid at a collective concentration of 0.1-5 wt % of the treatment composition; adding a dosage of the treatment composition to a mixture of contaminated fluids including a liquid
(Continued)

portion and a gaseous portion; and allowing the treatment composition to react with the mixture of contaminated fluids for at least 10 minutes, wherein a pH of the treatment composition is at least 13.0 and the aqueous solution contains at least one of NaOH and KOH.

8 Claims, 4 Drawing Sheets

Related U.S. Application Data application No. PCT/US2022/028379, filed on May 9, 2022.

(60) Provisional application No. 63/185,808, filed on May 7, 2021.

(51) Int. Cl.
| | |
|---|---|
| *B01D 53/52* | (2006.01) |
| *B01D 53/54* | (2006.01) |
| *B01D 53/62* | (2006.01) |
| *B01D 53/78* | (2006.01) |
| *C10L 3/10* | (2006.01) |

(52) U.S. Cl.
CPC .............. *C10L 3/103* (2013.01); *C10L 3/104* (2013.01); *C10L 3/106* (2013.01); *B01D 2251/304* (2013.01); *B01D 2251/306* (2013.01); *B01D 2251/604* (2013.01); *B01D 2251/90* (2013.01); *B01D 2257/504* (2013.01); *C10G 2300/202* (2013.01); *C10G 2300/205* (2013.01); *C10G 2300/207* (2013.01); *C10L 2290/545* (2013.01)

(56) References Cited

U.S. PATENT DOCUMENTS

| | | | |
|---|---|---|---|
| 3,586,622 | A | 6/1971 | Thompson |
| 3,708,421 | A | 1/1973 | Rippie |
| 3,897,219 | A | 7/1975 | Sibeud et al. |
| 4,417,986 | A | 11/1983 | Connaught et al. |
| 4,746,442 | A | 5/1988 | Calemma et al. |
| 5,635,056 | A | 6/1997 | Brons et al. |
| 5,667,760 | A | 9/1997 | Sweeney |
| 7,914,669 | B2 | 3/2011 | Martinie et al. |
| 9,028,679 | B2 | 5/2015 | Morris |
| 10,550,337 | B2 | 2/2020 | Roe et al. |
| 2003/0132104 | A1 | 7/2003 | Yamashita et al. |
| 2006/0185985 | A1 | 8/2006 | Jones |
| 2009/0065399 | A1 | 3/2009 | Kocal et al. |
| 2010/0056404 | A1 | 3/2010 | Talley |
| 2013/0323143 | A1 | 12/2013 | Olfi et al. |
| 2015/0037274 | A1 | 2/2015 | Walia et al. |
| 2020/0239789 | A1 | 7/2020 | Roe et al. |
| 2023/0348795 | A1* | 11/2023 | Roe ........................ C10G 29/16 |

OTHER PUBLICATIONS

Mike Nicholson/Tim O'Brian, Baker Petrolite Corporation, "Hydrogen Sulfide in Petroleum", pp. 1-28, found at www.coqa-inc.org/docs/default-source/meeting-presentations/20010531H25.pdf.

Heitman et al., "Oxidation and incorporation of hydrogen sulfide by dissolved organic matter", Chemical Geology 235 (2006), pp. 12-20.

Yang et al., "Novel Process of Removal of Sulfur Dioxide by Aqueous Ammonia-Fulvic Acid Solution with Ammonia Escape Inhibition", energy&fuels article 2016, 30, pp. 3205-3218.

Pohlabein et al., "Experimental Evidence for Abiotic Sulfurization of Marine Dissolved Organic Matter", frontiers in Marine Science,, published Nov. 15, 2017, vol. 4, Article 364, pp. 1-11.

Shi X, Li Q,Wang T, Lackner KS (2017), "Kinetic analysis of an anion exchange absorbent for CO2 capture fromambient air." PLoS ONE 12(6): e0179828. https://doi.org/10.1371/journal.pone.0179828, pp. 1-12.

Elliot, Louis D., "The freezing point curve of the system water-ammonia", The Journal of Physical Chemistry 28.8 (Aug. 1924): pp. 887-888, Figure 1.

Bauer et al., "Electron Transfer Capacities and Reaction Kinetics of Peat Dissolved Organic Matter", Environmental Science & Technology, vol. 41, No. 1, 2007, pp. 139-145.

Boggs et al., "Humic Substances in Natural Waters and Their Complexation With Trace Metals and Radionuclides: A Review", Argonne National Laboratory, Illinois, 60439, Chemical Technology Division, Jul. 1985.

Einsiedl et al., "Evidence for Incorporation of H2S in Groundwater Fulvic Acids from Stable Isotope Ratios and Sulfur K-edge X-ray Absorption Near Edge Structure Spectroscopy", Environmental Science & Technology, vol. 42, No. 7, 2008, pp. 2439-2444.

Einseidl et al., "Combined sulfur K-edge XANES spectroscopy and stable isotope analyses of fulvic acids and groundwater sulfate identify sulfur cycling in a karstic catchment area", Chemical Geology, 238, 2007, pp. 268-276.

Perlinger et al., "Addition of Hydrogen Sulfide to Juglone", Environmental Science & Technology, vol. 36, No. 12, 2002, pp. 2663-2669.

Senesi et al., "The Role of Free Radicals in the Oxidation and Reduction of Fulvic Acid", Soil Research Institute, Agriculture Canada, Soil Biol. Biochem. vol. 9, 1977, pp. 397-403.

Zhiguo Yu, "Electron Transfer Processes between Hydrogen Sulfide and Humic Substances—Implications for Anaerobic Sulfur Cycling in Freshwater Ecosystems", Dissertation to obtain the degree of Doctor of Natural Sciences at the Faculty of Biology / Chemistry / Earth Sciences.

Baguena, Beltran, "Humic acids and Fulvic acids I Humic Acids: Interview with D. Gregorio Murillo by the communications department of ACEA" Jilco Industrial, SA, (2019) (obtained from acidoshumicos.com Nov. 2019) (Year: 2019).

Panza et al., "Hydrogen sulphide removal from landfill gas", Process Safety and Environmental Protection 88, 2010, pp. 420-424.

\* cited by examiner

CHEMICAL COMPOSITIONS AND METHODS OF USING SAME FOR REMEDIATING SULFUR-CONTAINING COMPOSITIONS AND OTHER CONTAMINANTS IN FLUIDS

CROSS-REFERENCE TO RELATED APPLICATIONS

This is a divisional of U.S. non-provisional application Ser. No. 17/857,084, filed Jul. 4, 2022, which is a continuation of International Application of PCT/US2022/28379, filed May 9, 2022, which claims priority to U.S. Provisional Application Ser. No. 63/185,808, filed May 7, 2021. The entire subject matter of these priority applications are incorporated by reference herein.

BACKGROUND OF THE INVENTION

1. Field of the Invention

The present disclosure relates to novel treatment compositions and treatment methods for remediating targeted compounds including sulfur-containing $H_2S$, mercaptans, thiophenes and BTEX (benzene, toluene, ethylbenzene, xylenes), and other contaminants including $CO_2$, $SO_2$, metals, and salts, in various contaminated fluids, which can be liquids, gasses and mixtures of these. Some examples include hydrocarbon based liquids and gasses such as crude oil and natural gas, emission gasses from fossil fuel combustion, and so-called produced water which is extracted with crude oil and natural gas. More particularly, the present disclosure relates to such treatment compositions, a novel pretreatment of contaminated gasses using an alkaline water wash and treatment methods in which the contaminated fluids and fluid mixtures are chemically reacted with the treatment compositions in the treatment methods whereby almost all of the contaminants in the fluids are remediated down to very low levels that have been deemed safe in an efficient and economically practical manner.

2. Background

Sulfur-containing compounds including hydrogen sulfide ($H_2S$), mercaptans, thiophenes and BTEX have long been recognized as undesirable contaminants in contaminated fluids, particularly in hydrocarbon fluids such as crude oil and natural gas. $H_2S$ is a particularly undesirable contaminant because it is highly toxic, corrosive, etc. and generally hydrocarbon fluids should contain less than five ppm $H_2S$. Remediation of $H_2S$ in hydrocarbon fluids has long been and remains a very important focus of petroleum industries around the world, and typically natural gas is regulated by governments around the world to contain no more than 4-5 ppm in order to be sold or used.

Treating of contaminated liquids such as crude oil can be challenging, but there are many known treatment compositions and treatment processes for such purpose, including some treatment compositions and treatment processes previously proposed by the present inventor, e.g., those disclosed in International Patent Application Nos. PCT/US2018/050913 and PCT/US2018/064015, the entire contents of which are incorporated herein by reference. In such processes previously proposed by the present inventor, the treatment compositions may be directly added to or combined with contaminated liquids such that chemicals included in treatment compositions, primarily hydroxide compounds, can react with the contaminants to remediate the contaminants into other, less problematic, non-toxic compounds which may stay in the treated liquids or precipitate out of the treated liquids.

One of the inventor's prior proposals for treating contaminated liquids, as disclosed in PCT/US2018/050913, involves an aqueous treatment composition containing primarily a high concentration of one or more hydroxides such as sodium hydroxide (NaOH) and potassium hydroxide (KOH), e.g., collectively the hydroxides account for 35-55 weight percent, and preferably at least 45 weight percent of the treatment solution, which efficiently react with $H_2S$ to convert it to non-toxic substances. Such treatment solution according to the recent proposal is highly alkaline with a pH of 13-14. In such treatment process a relatively small dosage of the treatment solution is added to the hydrocarbon based liquids or aqueous solutions being treated, e.g., at a standard dosage rate of 0.25-6.0 ml of the treatment solution/liter of the liquid being treated, preferably 1.0-5.0 ml of the treatment solution/liter of the liquid being treated, which corresponds to approximately 125-3000 ppm of hydroxide(s) in the liquid being treated. A particularly appropriate dosage rate depends on multiple factors, and the hydroxide(s) in the solution efficiently remediate the $H_2S$ and other sulfur-containing compounds down to acceptable levels within relatively short time periods such as 15 minutes to a few hours, and without otherwise detrimentally affecting the hydrocarbon-petroleum based liquids or contaminated aqueous solutions in any significant manner.

Very significantly, this previously proposed treatment process including the treatment composition is not reversible in relation to $H_2S$ and the other contaminants that are remediated, unlike previously known $H_2S$ scavenging compositions involving triazine or formaldehyde and processes using the scavenging compositions for remediating $H_2S$ and other contaminants in liquids including crude oil. Also, very significantly, the standard dosage of the treatment composition discussed above is appropriate for remediating contaminated liquids, including crude oil, having a wide range of the amounts of contaminants contained therein, which is also very different from previously known $H_2S$ scavenging compositions involving triazine or formaldehyde which require more specific dosage rates based on the amount of $H_2S$ and other contaminants that are being scavenged. Thus, barring an anomalous liquid containing an exceptionally large content of contaminants it is typically not necessary to adjust the dosage amount based on the particular amount of contaminants contained in a liquid to be treated and the treatment process is not detrimentally affected if the amount of contaminants in the liquids being treated spikes at times during the process.

Another previous proposal by the inventor, as disclosed in PCT/US2018/064015, involves use of an aqueous based treatment composition which is similar to the composition disclosed in PCT/US2018/050913 but additionally includes an appropriate amount of organic acid(s) such as fulvic acid and humic acid, which is added to the treated liquid at a dosage rate that will typically result in a concentration of the organic acid(s) in the liquid being treated being in a normal range of 0.01-10 ppm, preferably 0.1-3 ppm, whether the liquid is a hydrocarbon based liquid or contaminated aqueous solution. The organic acid(s) such as fulvic acid and humic acid are effective to bind to the remediated contaminants and maintain them in the treated liquids without forming any precipitates while the contaminated liquids are being treated, transported and/or stored for a period of time such as hours, days or weeks before the treated liquids are further processes at a refinery or the like. A small amount, e.g., less than 2 wt % of an anti-scaling agent such as monoethanolamine (MEA) may be in this treatment process/composition.

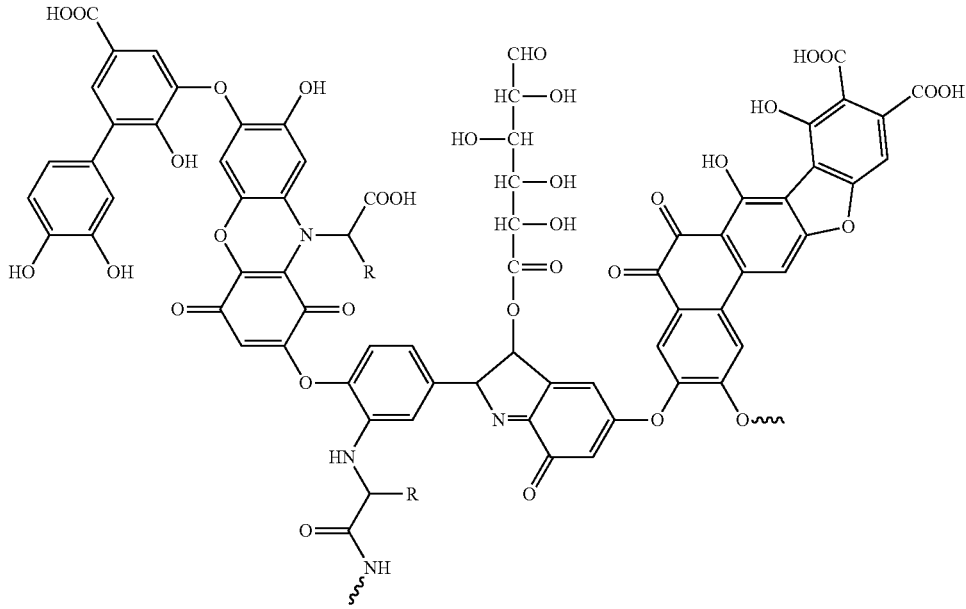

The treatment composition and process according to this previous proposal involves a standard dosage of the treatment composition generally corresponding to the standard dosage of the first previous proposal discussed above. This previously proposed treatment composition and process are also advantageously not reversible, and the standard dosage of the treatment composition discussed above is appropriate for remediating contaminated liquids, including crude oil, having a wide range of the amounts of contaminants contained therein.

While the inventor's previous proposals for treating contaminated liquids are much more effective, as well as more cost efficient and practical, than the previously known treatment compositions and treatment processes, there is always a desire for improvement.

Treating contaminated gasses is generally far more challenging than treating contaminated liquids for multiple reasons. Although there are many known treatment compositions and treatment processes for treating contaminated gasses, in many instances the conventional treatment compositions and treatment processes are not sufficiently effective at remediating the contaminated gasses in a practical, cost effective manner. For example, there are many known natural gas deposits around the world which are heavily contaminated with $H_2S$, along with other significant contaminants including other species of sulfur-containing compounds, carbon dioxide ($CO_2$), ammonia ($NH_3$), water ($H_2O$), salts such as sodium chloride (NaCl), nitrogen ($N_2$), crude oil, various solid matters, including organic matter, etc., and these have proven to be most challenging. Using the conventionally known treatment compositions and treatment processes, it has not been possible to sufficiently remediate such highly contaminated natural gas in a practical, cost-effective manner to make the natural gas appropriate for sale or use. Correspondingly, many of the known gas deposits and existing natural gas wells are not being used, but remain un-tapped or capped.

Relative to treating contaminated gasses including natural gas, one of the present inventors has previously proposed a treatment composition and treatment process for such purpose in U.S. Pat. No. 10,913,911 B2 (the '911 patent), the contents of which are incorporated herein by reference. The '911 patent discusses multiple reasons why treating contaminated gasses is much more complicated than treating contaminated liquids such as crude oil and contaminated aqueous solutions, even when the primary contaminant for remediation in the gases is $H_2S$ just as $H_2S$ is the primary contaminant for remediation in crude oil. The reasons primarily include a few significant complications associated with treating large volumes of contaminated natural gas on a continuous basis, whereby the treatment compositions and processes used for treating contaminated liquids cannot be directly applied for treating contaminated gasses. For example, contaminated gasses such as natural gas often contain significant amounts of other contaminants in addition to $H_2S$, e.g., carbon dioxide ($CO_2$), nitrogen ($N_2$), water ($H_2O$), sodium chloride (NaCl), etc. which can cause great inefficiencies in gas treatment processes, including that some of the contaminants such as salts may tend to precipitate from the contaminated natural gas when it is treated, which can readily clog up parts of the treatment system and otherwise detrimentally affect the treatment process. Further, the nature of natural gas is much different from the nature of crude oil and other liquids, including that the value of natural gas on volume basis is much less than crude oil, e.g., natural gas is typically, continuously discharged from a well at significant velocities, pressures and volumes of millions of cubic feet per day per well, and it must be handled and processed much differently than liquids and this creates other complications for treating these contaminated gasses. For example, a treatment process for remediating a contaminated gas such as natural gas may only permit contact between the treatment composition and the contaminated gas for a few seconds or less, unlike treatment of contaminated liquids which may simply involve adding appropriate amounts of treatment composition to the contaminated liquids and then allowing the liquids sit for an appropriate time until the $H_2S$ and other contaminant(s) in the liquid are remediated down to safe, acceptable levels.

As discussed in the '911 patent, an aqueous based treatment composition may be used for remediating $H_2S$, $CO_2$ and other problematic contaminants in gasses down to safe levels, but it may be necessary to initially treat the natural gas to remove other contaminants including salts and water, so that remediation of the $H_2S$, $CO_2$ and other problematic contaminants may be conducted continuously and efficiently. A treatment composition as disclosed in the '911 patent according to the inventor's previous proposal is aqueous based and similar to that disclosed in PCT/US2018/064015. It includes a high hydroxide concentration for remediating the $H_2S$, $CO_2$, etc. as well as a smaller amount of organic acid(s) such as fulvic acid and humic acid to prevent formation and release of precipitates from the treated gas, and may further include a chelating agent such as ethylenediaminetetraacetic acid (EDTA), which among other things increases the efficiency of hydroxide compounds in remediating $H_2S$ and other contaminants and helps to make the remediation of $H_2S$ irreversible, a surfactant such as sodium lauryl sulphate and a buffering agent such as potassium carbonate, etc. A quantity of such treatment composition may be disposed in a reaction chamber or tower and the natural gas may be bubbled through the treatment composition whereby $H_2S$, $CO_2$ and some other contaminants in the natural gas will be remediated while causing little or no precipitates to form and be released from the treated gas. Prior to such remediation step, however, the treatment process may require additional, preliminary treatment steps and equipment for removing water, salts, etc. from the natural gas before the gas is reacted with the treatment composition. Salts are likely to precipitate out of the treated gas if the salts are present when the gas is reacted with the treatment composition and the salt precipitates tend to cause clogging and other problems that would make this part of the treatment process inefficient if they are present. Water in the natural gas will typically have salts dissolved therein, and will tend to undesirably dilute the treatment composition.

The inventor's previously proposed treatment compositions and processes for remediating contaminants in gasses have proven to be much more practical and cost effective at sufficiently remediating the $H_2S$ and other contaminants in gasses such as natural gas in comparison to previously known treatment compositions and treatment processes, and like the inventors' proposals for remediating $H_2S$ and other contaminants in liquids, these treatment compositions and processes for remediating contaminants in gasses remediate the $H_2S$ and other contaminants in the gasses non-reversibly and a standard dosage of the treatment composition is advantageously effective for remediating the contaminants over a wide range of contents. However, the previously proposed treatment solutions and processes for gasses still remain to be improved on. For contaminated gasses and mixtures of contaminated fluids including gasses, it still remains a great challenge in the art for remediating $H_2S$, $CO_2$, and other contaminants therein down to appropriate, safe levels in a practical, cost effective manner.

SUMMARY OF THE INVENTION

The inventor has further studied the treatment of contaminated fluids, including liquids, gasses and mixtures of these, and have discovered new treatment solutions/compositions and treatment processes which may be used individually or in combination for remediating contaminated fluids, and which are very effective, efficient and economically practical for remediating and/or removing essentially all types of contaminants, including $H_2S$, $SO_2$, other sulfur based contaminants including mercaptans, thiophenes, $CO_2$, $NH_3$, salts, BTEX chemicals, etc. as contained in contaminated gasses, contaminated liquids, and in mixtures of various liquids and gasses down to safe, acceptable levels.

A first discovery made by the present inventor is that when the previously proposed treatment compositions are used for treating mixtures and mixture streams of contaminated fluids, including fluid mixtures highly contaminated with $H_2S$ and other contaminants, such fluid mixtures may be efficiently and effectively treated for remediation of the $H_2S$ and other contaminants by adding a treatment composition such as one of those disclosed in PCT/US2018/064015 and the '911 patent, and variations thereof to the contaminated fluid mixture at an appropriate dosage rates. Such treatment may be effected relatively to a continuously flowing fluid mixture stream, or fixed or batch quantity of a fluid mixture. As one example, crude oil, natural gas and contaminated water which are typically all extracted simultaneously from a given well, may be directly transported to a refinery as a mixed stream or the fluids may be separated from each other by a three-way separator shortly after being extracted from the earth, e.g., the separator receives a stream of the mixed fluids from the well and separates these into three different output streams. If the fluid mixture is to be transported directly to a refinery, dosage(s) of the treatment composition(s) may simply be added to the fluid mixture such that the treatment composition(s) will remediate contaminants in the mixture as it flows toward the refinery, which may be miles away and may take more than 1 hour. If the fluids are separated from each other, the crude oil and natural gas may be transported, stored and refined, while the contaminated water may be disposed of by being treated and/or injected back into the earth. The crude oil and natural gas are often transported in pipelines which limit the content of $H_2S$ in these fluids to relatively low levels, e.g., 5 ppm or less. However, there are some pipelines that will accept a mixture of contaminated crude oil and contaminated natural gas so as to transport these fluids for further processing at refineries or the like, and even though the natural gas may have a much higher content of HIS therein than 5 ppm. Thus, the separated crude oil and natural gas streams from a separator may be recombined in such a pipeline for being transported together.

The first discovery made by the inventor is that by adding an appropriate quantity treatment composition, such as one of the compositions disclosed in PCT/US2018/064015 and the '911 patent, into a mixed fluid stream flowing in a pipeline, as the fluid mixture continues to flow in the pipeline, e.g., typically for miles and over a period of an hour or more, the treatment composition will react with and remediate the $H_2S$ and other contaminants in both the liquid and gaseous components of such fluid mixture such that the content of $H_2S$ and other contaminants will be significantly reduced and essentially no precipitates will be discharged from the treated fluids in the pipeline. The added treatment composition primarily will remain in the liquid portion(s) of the mixed fluids and correspondingly has more effect in remediating the contaminants in the liquid portion(s), but as the mixed fluid flows along the pipeline there is significant mixing and comingling between the liquid and gas portions and the contaminants in the gas portion(s) are also remediated to some extent. The inventor has determined that even if the contaminated fluid mixture contained a relatively high content of $H_2S$, $CO_2$, etc., e.g., 60,000 ppm or as high as several hundreds of thousands of ppm, by addition of an appropriate dosage of one of the treatment compositions to the mixture the content of the $H_2S$ $CO_2$, and other contaminants in the liquid portion of the mixture, e.g., crude oil, may be reduced down to a safe level below 5 ppm, and the content of the $H_2S$, $CO_2$, and other contaminants in the gaseous portion of the mixture, e.g., natural gas, will be significantly reduced, e.g., down below 30,000 ppm. Discharge of any amount of precipitate(s) from the treated mixed fluids in such pipeline is very undesirable as this may partially or completely clog the pipeline, and would require the pipeline to be shut down for corrective action, but the discussed treatment compositions contain organic acid(s) such as fulvic acid and humic acid which are advantageously, very effective at preventing formation and release of precipitates from the treated fluids. Like the inventor's previous proposals for remediating $H_2S$, $CO_2$, and other contaminants in liquids and gasses, contamination remediation achieved with these treatment compositions and processes are non-reversible relative to the $H_2S$ and other contaminants, and a standard dosage of the treatment composition such as mentioned above is advantageously effective for remediating the contaminants over a wide range of contents regardless of any spikes in the content of the contaminants. This treatment process applies to any mixture of contaminated fluids, which may be more than two, e.g., the process could be applied to the crude oil, natural gas and so-called produced water directly as these fluids are discharged from wells and before they are separated by a separator.

For effecting such treatment process according to the present invention, the treatment composition may be added to the fluid mixture continuously or non-continuously, and the inventor has determined that one appropriate manner for adding the treatment composition to the fluid mixture may optionally involve the use of a mixing chamber which continuously receives the fluids to be treated therein and also receives a flow of the treatment composition therein, e.g., the fluids and treatment composition are injected at lower portions of the mixing chamber, and some of the mixed fluids having a dosage of the treatment composition mixed therewith is discharged from an upper portion of the mixing chamber into a pipeline which transports the mixed fluids to other locations during which time the treatment composition remediates contaminants in the fluid mixture. Another method simply involves pumping or injecting the treatment composition into the pipeline containing the fluid mixture at an appropriate dosage rate(s). However, other methods of adding the treatment composition may be used. Also, this treatment process may be applied to stationary, fixed volumes of the mixed, contaminated fluids which are not flowing.

Again, the present inventor has discovered that for such treatment system and process, treatment compositions such as disclosed in PCT/US2018/064015 and the '911 patent, as well as variations thereof, are appropriate for treating the contaminated fluid mixture because the components of these compositions will perform similar remediation functions simultaneously to all of the fluids in a mixture as they perform when separately treating liquids or gasses, but increased efficiency is achieved when treating the mixture. PCT/US2018/064015 discloses a concentrated aqueous hydroxide solution with 35-55 wt % of one or more hydroxide compounds as the main component, e.g., at least 80 wt % and preferably at least 90 wt %, of the new treatment composition, together with a small amount, e.g., 0.1-3 wt % of an organic acid such as fulvic acid or humic acid, and possibly a small amount of MEA, e.g., 0.1-3 wt %, and perhaps an antibacterial compound such as potassium silicate. The concentrated hydroxide compound(s) react with $H_2S$, $CO_2$ and other contaminants to remediate same, while the organic acids such as fulvic acid and humic acid function to prevent any precipitates from being generated and released from the treated fluids. If included as an optional component, MEA functions as an anti-scaling agent. On the other hand, the treatment composition disclosed in the '911 patent may also be an aqueous solution primarily including a high concentration of hydroxide compound(s), e.g., 35-55 wt % of one or more hydroxide compounds as the main component, e.g., at least 80 wt % and preferably at least 90 wt %, of the treatment composition, together with: 0.1-3 wt % of organic acid(s) such as fulvic acid or humic acid; a small amount, e.g., e.g., 0.5-4 wt %, of EDTA ($C_{10}H_{16}N_2O_8$) which is a type of chelating agent that, among other things, helps to improve molar reactivity of the hydroxide compound(s) and helps to prevent formation of precipitates; and possibly smaller amounts, e.g., 0.01-0.1% volume, of a surfactant such as sodium lauryl sulphate and a buffering agent such as potassium carbonate, etc. The inventor has further discovered that some other components may be included in the previously proposed treatment compositions, depending on desired outcome of the treatment processes. The treatment compositions may also include a small amount, e.g., 0.5 to less than 5 wt %, preferably less than 2 wt %, of a polymer which can also help prevent precipitates from being released from the treated fluids. An example of such a polymer is a commercially available anionic polymer identified under product code 3640. The treatment compositions may also include 0.1 to 8.0 wt % of sodium sulfide ($HNa_2S$) or its hydrate $Na_2S \cdot 9H_2O$, both of which are colorless solids. The inventor has significantly discovered that including sodium sulfide in the new treatment compositions can be very effective for reducing total sulfur content of contaminated fluids.

An appropriate amount of such treatment compositions will, of course, be based on the amount of the mixed fluid being treated and the levels of contaminants contained therein. For a typical oil well with well head piping having a diameter of 2-10 inches and operating continuously may have an output of 5,000-10,000 barrels of crude oil and 10 million to 20 million $ft^3$ of natural gas/day (24 hours) and wherein the $H_2S$ content of the mixed fluid may be 60,000 ppm or up to several hundred thousand ppm. The inventors have found that an appropriate amount of treatment composition for such may be in a range of 5 to 20 gallons of treatment composition added per hour or 120-480 gallons per day. The inventor has determined that under these conditions, if the fluid mixture originally contains 60,000 ppm $H_2S$ or more, the treated crude oil in the mixed fluid will have less than 5 ppm $H_2S$ and often 0 ppm $H_2S$, while the treated natural gas in the mixed fluid will have less than 30,000 ppm $H_2S$, which is appropriate to make the gas acceptable for a pipeline to transport the gas to a refinery.

Concurrent treatment of the mixed fluids according to the present invention is particularly effective and advantageous because the dosage amount of the treatment composition added to the mixed fluid may correspond to an amount that would normally be added to a liquid having large amounts of $H_2S$ and other contaminants therein for remediating the contaminants down to safe, acceptable levels, which the treatment composition still does for the liquid portion of the mixed fluid. However, as an added benefit in this treatment process the same treatment composition also functions to remediate the $H_2S$ and other contaminants in the gaseous portion of the fluid mixture to a significant extent.

A second discovery made by the present inventor pertains to treatment of contaminated gasses. Such gasses include, natural gas from a well which may contain significant amounts of salts, $CO_2$, $H_2S$, $NH_3$, $SO_2$, other sulfur based contaminants including mercaptans and thiophenes, and metals, natural gas which has been partly treated according to the inventors' first discovery discussed herein, combustion gasses from fossil fuels from various industries including power producing plants which typically have high concentrations of $CO_2$ and $SO_2$, gas streams including water vapor with salts and metals therein, etc. Specifically, the inventor has discovered that if a water wash is modified to be alkaline with an elevated pH above 8, and preferably in a range from above 8 to about 11, by addition of one or more alkaline substances including hydroxide compounds, such an alkaline water wash is surprisingly extremely effective at removing most of the contaminants from the contaminated gasses in a treatment process whereby the gasses are bubbled or otherwise passed through the alkaline water wash with a contact time in a range of 0.5-10 seconds. The inventor has experimented with such a treatment process using the alkaline water wash according to the second discovery and found that it is surprisingly, very effective at removing and/or remediating most of the salts, $CO_2$, $H_2S$, $SO_2$, other sulfur based contaminants including mercaptans and thiophenes, and metals from the contaminated gasses, and if the alkaline water wash solution is regularly replaced or refortified to maintain its potency/effectiveness, it can be efficiently used to remove most of the contaminants from various contaminated gas streams, including highly contaminated gas streams, in a practical, cost effective manner.

Water is generally effective for removing salts from contaminates gasses because the salts are very soluble in water and easily pass from the gasses to the water when the gasses contact the water in the water wash. However, the inventor has discovered that if the water of the water wash is made alkaline with a pH above 8 by the addition of alkaline substances such as hydroxide compounds, then the water wash becomes surprisingly very effective at removing essentially all of the salts from the gasses, and also becomes very effective at removing and/or remediating significant amounts of $H_2S$ and other sulfur based contaminants $CO_2$, metals, and essentially all other contaminants from the gasses. For example, the inventor has discovered that if the pH of the water wash is increased to a level of around 11 by the addition of alkaline substances such as hydroxide compound(s), if a gas highly contaminated with $H_2S$, $SO_2$, $CO_2$, salts, etc. is passed through the alkaline water wash with an appropriate contact time of at least 0.5-10 seconds, and preferably at least 1.5 seconds: 1) essentially all of the salts pass from the gas into the water wash and precipitate out of the alkaline water wash; 2) much of the sulfur based contaminants in the gas, including $H_2S$, $SO_2$, mercaptans and thiophenes, are remediated by reacting with the alkaline substances such as hydroxide compound(s) added to the water wash and then precipitate out of the gas and/or the water wash as elemental sulfur and/or sulfur compounds generated by such remediation reactions; 3) much of the carbon based contaminants in the gas, including $CO_2$ and $CO$, are remediated by reacting with the alkaline substances such as hydroxide compound(s) added to the water wash and then precipitate out of the gas/alkaline water wash, e.g., as carbonate crystals; and 4) much of the metal contaminants in the gas also react with the alkaline substances such as hydroxide compound(s) added to the water wash and then precipitate out of the gas/alkaline water wash. If the content of each of $H_2S$ and $CO_2$ in the gas is approximately 30,000 ppm before the water wash, after passing through the alkaline water wash the content of each of these may be reduced to be in a range of approximately 5,000 ppm or less.

The pH of the water wash could be increased above 11 by addition of greater amounts of alkaline substances such as hydroxide compounds and such alkaline water wash solution would also be very effective at removing most of the contaminants from the contaminated gasses, but as a practical matter in terms of cost, it takes proportionally much more of such substances to increase the pH above 11 than it takes to increase the pH of the water from around 7 up to 11. On the other hand, the alkaline water wash solution becomes less and less effective at remediating and removing contaminants from gasses the more it is used, which is reflected by a reduction in pH, and the alkaline water wash may need to be changed regularly to maintain its effectiveness at remediating and removing contaminants from gasses. For example, the inventors have determined through testing that the alkaline water wash becomes less and less effective at remediating contaminants in the gases and/or causing them to precipitate from the gas/water wash when the pH of the water wash drops below 10, e.g., when the pH of the alkaline water wash drops to about 9.5 some of the $H_2S$ and $CO_2$ will begin to pass through, when the pH drops below 9 the alkaline water wash's ability to remediate and remove contaminants from gasses is significantly reduced from its original ability at a pH of 10 or above, and at a pH of about 8 the alkaline water wash's ability to further remediate and remove contaminants from gasses is essentially spent, even if the various precipitates being released from the treated gas and the water wash are removed on a continuous or somewhat continuous basis. Thus, the alkaline water wash solution could be most effective at removing and/or remediating contaminants from contaminated gasses, possibly close to 100% effective, if the solution is replaced whenever its pH drops to a value below 10, but this would not be the most practical, cost effective process of using the water wash solution for removing contaminants as there is still a significant amount of reactants in the alkaline water wash solution when the pH drops below 10. The inventors have found that the most practical, cost efficient process of using the alkaline water wash solution is to initially increase the pH up to about 11 by the additional of alkaline substances such as hydroxide compounds, use such solution to remove contaminants from a flow of the contaminated gas until the solution's pH drops to between 9 and 8, and then replace the solution with fresh solution having a pH of about 11, while repeating these steps as often as necessary.

A third discovery made by the present inventor also pertains to a new treatment composition which includes a significant amount of hydrocarbon based liquid(s) which may be used for treatment of contaminated gasses, including natural gas from a well, natural gas which has been partly treated according to the inventor's first discovery discussed herein, combustion gasses from fossil fuels which typically have high concentrations of $CO_2$ and $SO_2$, gas streams including water vapor with salts and metals therein, etc., and is particularly effective and cost efficient for completely remediating contaminants such as $H_2S$, $CO_2$, and metals, etc. in gasses when used in combination with an alkaline water wash treatment process according to the inventors' second discovery discussed herein.

A treatment composition according to the inventor's third discovery is a new alkaline hydrocarbon liquid based treatment composition having a pH of about 14 and through which may be used to treat contaminated gasses, e.g., the contaminated gasses may be passed through a volume of the treatment composition with a contact time of 0.5-10 seconds, and preferably at least 1.5 seconds to effect remediation of $H_2S$ and other contaminants in the gasses. A wide variety of hydrocarbon based liquids may be used in the new treatment compositions, including relatively light liquid(s) including alcohols, toluene, hexane, xylene, and others, as well as mixtures of these liquids, provided that the hydroxide compound(s) and any other components to be included in the treatment compositions may be fully dissolved or dispersed into the hydrocarbon based liquids. Alcohols are appropriate for use as the hydrocarbon liquids because they are polar so that other components of the treatment composition(s) are generally dissolvable and/or miscible therein. Lighter alcohols, including methanol ($CH_3OH$), ethanol ($C_2H_5OH$), and n-propyl alcohol ($C_3H_8O$), may be more appropriate based on lower cost and/or higher vapor pressure. Toluene, hexane, xylene are also appropriate as the hydrocarbon liquids because the hydroxide compounds and other components are dissolvable or dispersible therein, as they have relatively high vapor pressures which is desirable because more of the reactive hydroxide compound(s) may be contained in the vapors where they can better react with gaseous contaminants including $H_2S$ and $CO_2$. Other hydrocarbon liquids besides alcohols, toluene, hexane, and xylene may also be used provided that the hydroxide compound(s) and other components may be dissolved or dispersed therein. Also, the hydrocarbon liquids should have higher vapor pressures than water.

By using a hydrocarbon based liquid as a base solvent for the treatment composition, the vapor pressure of the treatment composition at standard temperature and pressure (STP) may be greater than the vapor pressure of the inventor's previously proposed water based treatment compositions at STP. Correspondingly, more of the treatment composition may be in vapor phase and may correspondingly have greater contact with contaminants including $H_2S$ and $CO_2$, which tend to be in vapor phase at STP, even when the $H_2S$ and $CO_2$ are in a mixed fluid stream containing liquid and gaseous fluids, and can more effectively and efficiently remediate the $H_2S$ and $CO_2$. When contaminated fluids such as crude oil, produced water and natural gas are extracted from the earth though a well, the fluids may be at a temperature of 90 to 120° F. by the time the fluids reach the earth's surface, but as the fluids flow through a pipeline toward a separator, refinery or other destination they will cool down to ambient temperature surrounding the pipeline, such that it is important that the treatment composition can be effective at remediating contaminants including $H_2S$ and $CO_2$ at STP. The new treatment compositions are effective for remediating $H_2S$, $CO_2$ and other contaminants in contaminated fluids at STP, but the remediation reaction(s) may proceed more quickly at elevated temperatures.

Generally, all hydroxide compounds may be used provided they can be dissolved or dispersed in the hydrocarbon liquid(s) of the all composition. However, some hydroxide compounds have lower cost, e.g., NaOH and KOH, and if used may make the composition and treatment processes using the composition more economically advantageous. Also, if the treatment composition is to be used with fluids such as crude oil and/or natural gas which include significant amounts of NaCl, which will typically be dissolved in any water included in the fluids, it may be desirable to use little or no NaOH to help prevent causing any salt to precipitate out of the treated fluids. The treatment composition may include 30-50 wt % collectively of one or more hydroxide compound(s). It is important that components of the composition other than the hydrocarbon liquid(s) should be dissolvable, dispersable and/or miscible in the hydrocarbon based liquid(s) used in the treatment composition as there should be no precipitates or the like from the treatment composition itself when used in the treatment processes of the present invention.

The new treatment compositions may include water, even a significant amount of water up to 50 volume %, but presence of water in the treatment compositions may increase the possibility of precipitates being formed and released from the fluids being treated, which is undesirable in many situations. Hydroxides tend to bond more strongly to water than to hydrocarbon liquids, and when the new treatment compositions are added to contaminated fluids containing water together with salts and/or other contaminants dissolved or dispersed in the water, the hydroxides bonded to the water may cause salts and other contaminants to be released from the treated fluids.

The new treatment compositions may also include amounts of other chemical compounds depending on the specific characteristics of the contaminated fluids being treated and desired results, including whether there is concern over formation and release of precipitates in—from the treated fluids, but the amounts of these other chemical compounds will be significantly smaller than the amount of the hydroxide compound(s) in the treatment compositions. For example, the new treatment compositions may include 0.01 to 6 wt %, of one or more organic acids such as fulvic acid and humic acid, which the inventor discovered are very effective for preventing substances that are formed from the remediated $H_2S$, as well as other contaminants, from precipitating out of the treated fluids. The treatment compositions may include 0.01 to 6 wt % of a chelating agent such as ethylenediaminetetraacetic acid (EDTA). Among other things, EDTA increases the efficiency of hydroxide compounds in remediating $H_2S$ and helps to make the remediation of $H_2S$ using the new treatment irreversible. The treatment compositions may also include 0.1 to 8.0 wt % of sodium sulfide ($HNa_2S$) or its hydrate $Na_2S \cdot 9H_2O$, both of which are colorless solids. The inventor has significantly discovered that including sodium sulfide in the new treatment compositions can be very effective for reducing total sulfur content of contaminated fluids. The treatment compositions may also include a small amount, e.g., 0.5 to less than 5 wt %, preferably less than 2 wt %, of a polymer which can also help prevent precipitates from being released from the treated fluids. An example of such a polymer is a commercially available anionic polymer identified under product code 3640. A surfactant such as sodium lauryl sulphate and a buffering agent such as potassium carbonate may be added in small amounts, e.g., 0.02 to less than 1 wt %.

When using the new treatment composition for treating contaminated gasses by passing the gasses through ha volume of the treatment composition, as the composition is used its pH will drop, and the inventor has determined that such composition is essentially spent and should be replaced when its pH drops to between 10 and 9. NaOH can be used as one of the hydroxide compounds in the hydrocarbon liquid based treatment composition, but is not preferred because formation and release of any precipitates and scale from the treated natural gas and/or from the hydrocarbon liquid based treatment solution would be undesirable as the precipitates and scale would tend to quickly build up and clog parts of the treatment system and the pipelines which receive the treated gasses. Na is a common component of salts, which are common precipitates. For purposes of contacting the contaminated gasses with the alcohol based treatment solution, a quantity of the treatment composition may be disposed in a bubble tower or other reaction chamber at ambient temperature and pressure and the gas may be bubbled or otherwise passed through the composition such with an appropriate contact time between the gas and the liquid composition as discussed above, and wherein there is a headspace above the treatment composition in the bubble tower or other reaction chamber where vapors of the treatment composition and the gasses being treated will contact each other for further, and in most cases complete, remediation of any of the contaminants which may remain in the gases, e.g., $H_2S$ and $CO_2$.

This new hydrocarbon liquid based treatment composition is particularly efficient and effective at remediating gaseous contaminants from the gasses because it has a relative high vapor pressure at ambient temperature and pressure, much more so than an aqueous based treatment compositions according the inventor's first and second discovers discussed herein. The hydroxide compound(s) in the treatment composition are also contained in the vapors of the composition such that they will have substantial contact with gaseous contaminants in the gasses, including $H_2S$ and $CO_2$, not only as the gasses are passed through the liquid treatment solution, but also in the head space above the treatment solution in a reaction chamber. Such contact between contaminants in the gasses and the vapors of the treatment composition is different from contact between contaminants in the gasses and liquids which are sprayed or injected into the gasses in atomized, fine droplets. The contact between the contaminants in the gasses and the vapors of the treatment composition is much greater than contact between the contaminants in the gasses and fine, atomized, liquid droplets because the vapor molecules are much smaller than the fine liquid droplets, and this results in more effective and efficient remediation of the contaminants. The treatment composition and process according to the inventors' third discovery have proven to be effective at completely remediating essentially all contaminants in the gasses, including $H_2S$, $CO_2$, and metals etc. in gasses including natural gas, combustion gasses from fossil fuels which typically have high concentrations of $CO_2$ and $SO_2$, etc. Gasses that are treated using the new hydrocarbon liquid based composition and process, including natural gas, are so clean that they may be directly, safely used by consumers without further treatment. Thus, for example, if the treatment process is carried out at or near a well from which natural gas is extracted, the treated gas may be directly compressed into LPG at the same location and then transportation and storage costs for the treated natural gas may be greatly reduced as an added benefit.

Further, the inventor has have determined that the treatment composition and treatment process according to the inventor's third discovery is particularly effective and efficient for completely remediating essentially all contaminants in gasses when used in combination with an alkaline water wash according to the inventors' second discovery discussed herein. Used together in series, the treatment compositions and processes according to the inventors' second and third discoveries have proven to be very suitable and economically practical for treating contaminated gasses, including natural gas, in a continuous manner at high flow rate and regardless of the amounts of $H_2S$, $CO_2$ and other contaminant(s) in the contaminated gases. The alkaline water wash according the second discovery is very effective at removing all of the salts and much of the other contaminants from the gasses at a relatively low cost even though this may require periodically or regularly replacing the alkaline water wash solution as it becomes spent or refortifying the alkaline water wash on a continuous basis because the alkaline water wash solution mostly contains water and alkaline substances such as hydroxides which are relatively inexpensive. Although the hydrocarbon liquid based treatment composition used in the treatment process according to the third discovery may have a significantly higher cost/unit volume than the alkaline water wash solution, the amount of contaminants which are removed using such hydrocarbon liquid based treatment composition and process is relatively small in comparison to the amounts of contaminants that are initially removed by the alkaline water wash. Correspondingly, the hydrocarbon liquid based treatment composition can be used for removing all or most of the remaining contaminants from a much greater volume of gas before the alcohol based treatment composition is spent and must be replaced or refortified. Also, the hydrocarbon liquid in the spent solution may be recovered and reused relatively inexpensively through distillation or other known processes. To any extent that the hydrocarbon liquid based treatment solution being replaced according to the processes of the present invention have any unused hydroxide compounds and organic acids remaining therein, these may be mixed with the produced water extracted with crude oil and natural gas from a well so as to reduce the content of $H_2S$ and other contaminants contained in the produced water before it is injected back into the earth.

As an example, the inventor has determined that in relation to a natural gas stream continuously flowing in the amount of five to ten million $ft^3$/day containing about 60,000 ppm of each of $H_2S$ and $CO_2$, as well as significant amounts of other sulfur based contaminants including mercaptans and thiophenes, BTEX compounds, water vapor, salts, and metals, etc., such stream may be sufficiently treated to remove and/or remediate all of the contaminants therein down to safe, acceptable levels using two bubble tower reactors, one for the alkaline water wash and the other for the hydrocarbon liquid based treatment composition. Each of such reactors may be four (4) feet in diameter and twenty (20) feet tall, one containing about 1410 gallons of the alkaline water wash and the other containing about 1410 gallons of the alcohol based treatment composition, which will fill the lower fifteen (15) feet of each reactor leaving five (5) feet of head space. Again, the alkaline water wash is considered spent and should be replaced when the pH drops from an initial value of about 11 to a value between 9 and 8 which is typically about every hour, and the hydrocarbon liquid based treatment solution is considered spent and replaced when the pH drops from an initial value of 14 to a value between 10 and 9, which may be about every eight (8) to ten (10) hours for treating this volume of contaminated gas.

Overall, the combination of the treatment compositions and processes according to the inventor's second and third discoveries is very effective and efficient at removing and/or remediating contaminants from gasses, even highly contaminated gasses in a practical, cost-effective manner. Very significantly, even the natural gas which currently remains untapped or capped around the world for which there was no previously known cost-effective treatment process can be successfully treated using this combination of the inventors' second and third discoveries. Further, if the inventor's first discovery is initially used to treat a mixture of crude oil together with the natural gas, this will add further benefit and cost efficiency to the treatment of these fluids. Also, the combination of the treatment compositions and processes according to the inventor's second and third discoveries can be used effectively and economically for a carbon sequestration/mitigation strategy. For example, if a contaminated gas contains 80,000 ppm or more of $CO_2/CO$ such as natural gas stream or fossil fuel combustion gas from a power producing plant at a volume of 13 million $ft^3$/day, the combination of the treatment processes according to the second and third discoveries can remove 57,058 kg or 63 tons/day of $CO_2$ that might otherwise be released into the atmosphere. The alkaline water wash by itself, again, may remove most of the $CO_2$, and correspondingly could be used for a carbon sequestration/mitigation strategy.

Intent of Disclosure

Although the following disclosure offered for public dissemination is detailed to ensure adequacy and aid in understanding of the invention, this is not intended to prejudice that purpose of a patent which is to cover each new inventive concept therein no matter how it may later be disguised by variations in form or additions of further improvements. The claims at the end hereof are the chief aid toward this purpose, as it is these that meet the requirement of pointing out the improvements, combinations and methods in which the inventive concepts are found.

DETAILED DESCRIPTION OF PRESENT EXEMPLARY EMBODIMENTS

Figure 1:
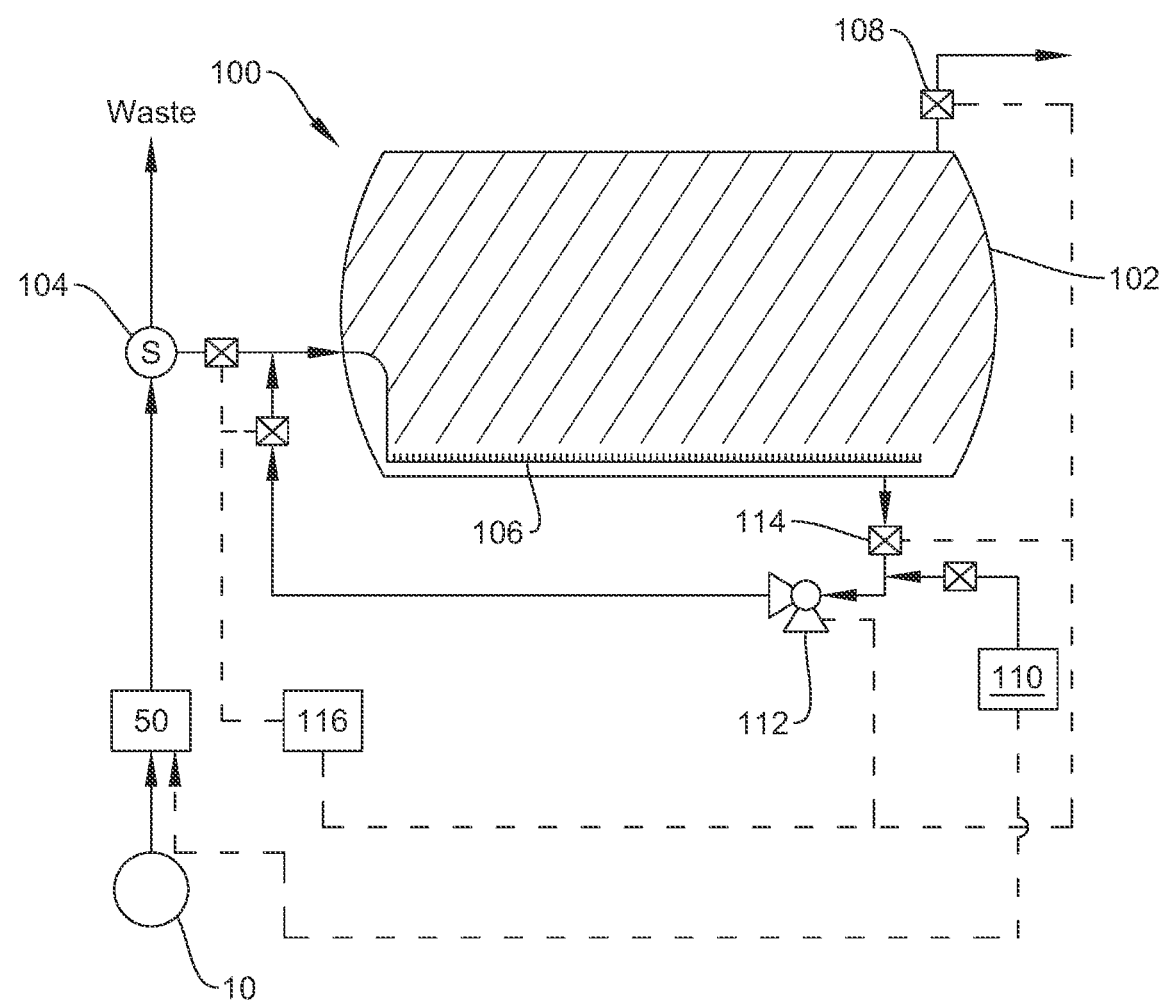
FIG. 1 is a schematic diagram of a mixing chamber which may be used in an exemplary embodiment of the present invention for combining a treatment composition according to the invention with a mixture of contaminated fluids so that the treatment composition according may remediate contaminants in all of the fluids to an exemplary embodiment of the present invention.
Figure 2:
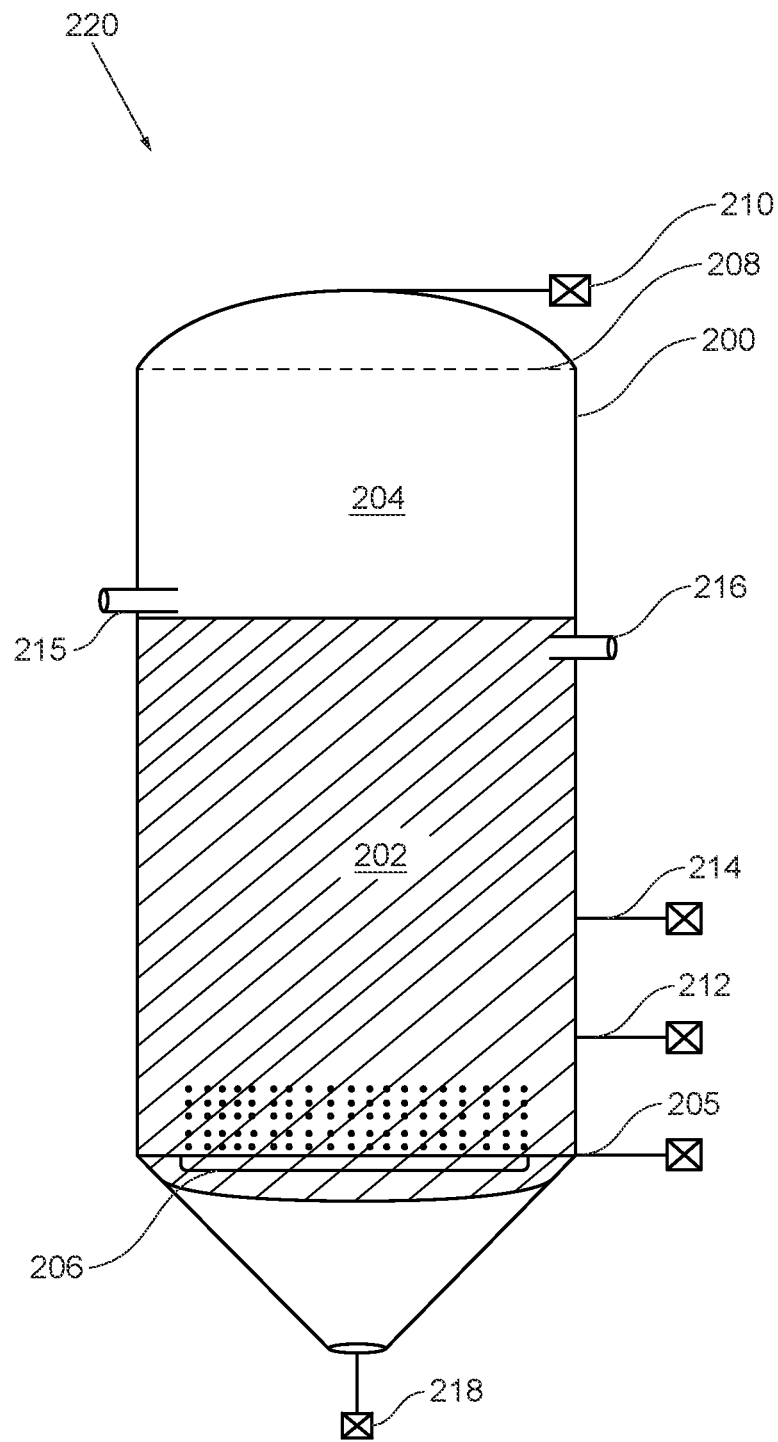
FIG. 2 is a schematic diagram of a water wash type reaction chamber which may be used in another exemplary embodiment of the present invention for removing most of the contaminants from a contaminated gas according to a second embodiment of the present invention.
Figure 3:
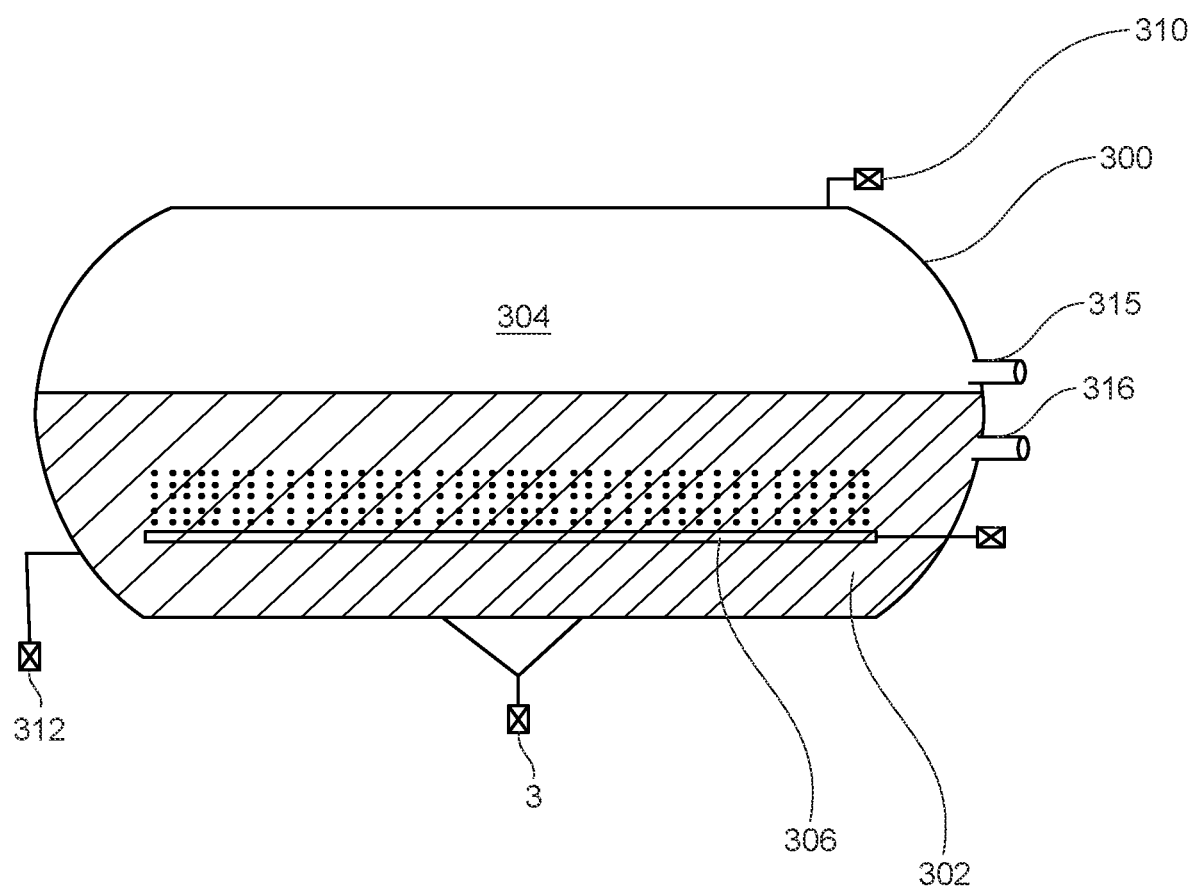
FIG. 3 is a schematic diagram of a PSA reaction chamber which may be used in another exemplary embodiment of the present invention for removing most or all of the contaminants from a contaminated gas according to a third embodiment of the present invention.
Figure 4:
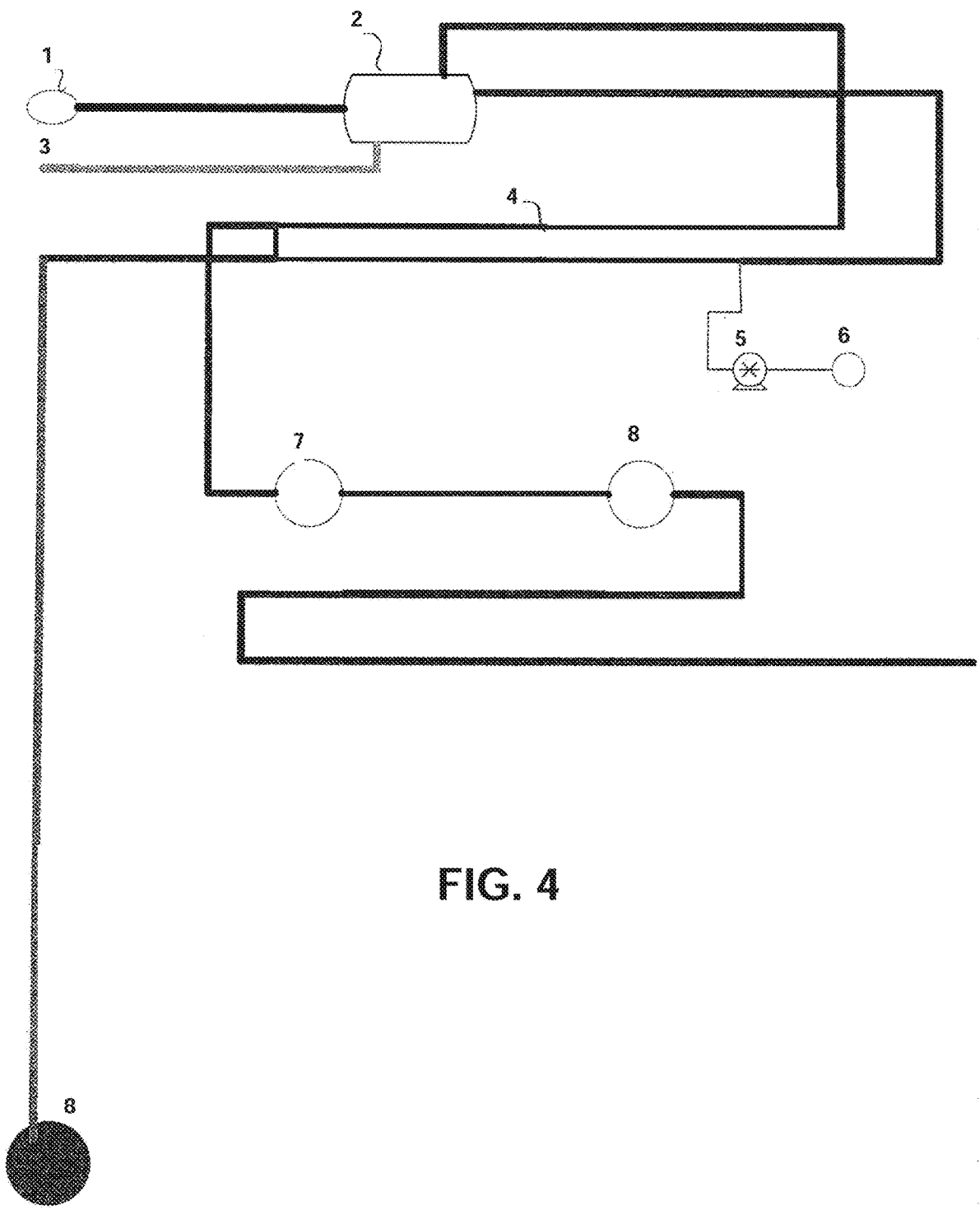
FIG. 4 is a schematic diagram explaining how the different embodiments of the present invention may be used together for efficiently remediating contaminants from a mixed fluid stream such as a stream of crude oil and natural gas from a well.

Exemplary embodiments of the present invention will be described below.
Primary aspects of the present invention involve use of novel treatment compositions in treatment processes for remediating contaminated fluid mixtures of liquids and gasses such as a mixture of crude oil and natural gas from a well, and for removing and remediating contaminants from contaminated gasses according to the exemplary embodiments. FIG. 1 is a schematic diagram of a treatment mixing chamber which may be used in an exemplary embodiment of the present invention for combining a treatment composition according to the invention with a mixture of contaminated fluids so that the treatment composition according may remediate contaminants in all of the fluids; FIG. 2 is a schematic diagram of a water wash type reaction chamber which may be used for removing most of the contaminants from a contaminated gas using an alkaline water wash solution according to another exemplary embodiment of the present invention; FIG. 3 is a schematic diagram of a bubble tower type reaction chamber which may be used for remediating most or all of the contaminants from a contaminated gas using an alcohol based treatment composition according to another exemplary embodiment of the present invention; FIG. 4 is a schematic diagram explaining how the different embodiments of the present invention may be used together for efficiently remediating contaminants from a mixed fluid stream, including a stream of crude oil and natural gas from a well.

Systems and Processes For Treating a Contaminated Fluid Mixture of Liquids and Gasses A first aspect and exemplary embodiment of the present invention pertains to the inventors' discovery that by adding an appropriate quantity treatment composition, such as one of the compositions disclosed in PCT/US2018/064015 and U.S. Pat. No. 10,913,911 and variations thereof, to a mixture of contaminated fluids, including a mixture of contaminated liquid(s) and contaminated gas(ses). For example, the contaminated fluid mixture may involve a stream of the contaminated fluids which is or will be flowing in a pipeline, as the fluid mixture continues to flow in the pipeline, e.g., typically for miles and over a period of an hour or more, the treatment composition will react with and remediate the $H_2S$ and other contaminants in both the liquid and gaseous components of such fluid mixture such that the content of $H_2S$ and other contaminants will be significantly reduced and essentially no precipitates will be discharged from the treated fluids in the pipeline. Combining the treatment composition with the mixture of contaminated fluids may be achieved in various manners, including direct injection of a dosage amount of the treatment composition into the mixed fluid stream or into a volume of one of the fluids whether flowing or not, or by using a mixing chamber. With reference to FIG. 1, for example, there is shown a system 100 for combining a mixture of contaminated fluids with a treatment composition for remediating contaminants in the mixture according to an exemplary embodiment of the present invention. The system 100 may generally include a horizontal mixing chamber 102 which receives a mixture of contaminated fluids from a source 104, a discharge nozzle 106 which discharges the mixed fluid into the mixing chamber, a discharge outlet 108 which discharges the fluid mixture from the mixing chamber after treatment composition has been added thereto, a supply 110 of the treatment composition, a re-circulation pump 112 which withdraws a portion of the mixed fluid from the mixing chamber 102 via a discharge outlet 114 at a bottom of the mixing chamber, adds some treatment composition from the supply 100 thereto and then adds the fluid mixture and treatment composition to the flow of untreated fluid mixture from the source 104 which is flowing into the reactor. A controller 116 such as a programmed electronic processing unit (ECU) may be provided for controlling operations of the system 100.

The mixing chamber 102 may be formed of an appropriate material such as carbon steel which is resistant to reacting with the mixed fluid and the contaminants in the mixed fluid including H2S, and may have an appropriate size based on the volume of mixed fluid being treated. For example if the volume of mixed fluid being treated is 5,000-10,000 barrels of crude oil and 10 million to 20 million ft3 of natural gas/day (24 hours), an appropriate size for the reactor 102 may be 4-10 feet in diameter and 12-25 feet long. The discharge nozzle 106 may include one or more pipe(s) extending longitudinally along the lower portion of the mixing chamber and having numerous small openings formed therein in pipe(s), whereby the fluid mixture will enter the mixing chamber in the form of small fluid streams containing bubbles of the gas in the mixture. The pressure of the mixed fluid stream and the gas bubbles will cause fluid streams discharged from the small openings to flow upward through a large volume of the mixed fluid and treatment composition already in the mixing chamber so as to thoroughly mix with the same. By the time that the mixed fluid and treatment composition reaches the upper portion of the reactor where a portion of the same is discharged through the outlet 108 the mixed fluid and treatment composition are combined in a fairly homogenous mixture.

The re-circulation pump 112 may be any appropriate type of pump, but the inventor has found that a pneumatic-diaphragm works appropriately for not only for re-circulating and mixing the mixed fluid with treatment composition from the supply 110, but also for maintaining an appropriate, desired concentration of the treatment composition in the mixing chamber and in the mixed fluid discharged from the reactor through outlet 108. A portion of the mixed fluid in the mixing chamber may be continuously withdrawn from a lower portion of the mixing chamber, mixed with additional treatment composition and then again flowed into the mixing chamber along with additional mixed fluid from the source 104. For continuously adding the treatment composition to the mixing chamber, the concentration of the treatment composition in the mixed fluid being withdrawn from the mixing chamber may be monitored to determine by a sensor (not shown). If the rate at which the treatment composition is being added needs to be adjusted based on the sense value, the rate at which the treatment composition is added via the re-circulation pump 112 may be appropriately adjusted by the controller 116.

The present inventor has discovered that when the previously proposed treatment compositions such as disclosed in PCT/US2018/064015 and U.S. Ser. No. 16/857,884 and variations thereof are used for treating a continuously flowing, large volume of a fluid mixture highly contaminated with $H_2S$ and other using the treatment system treatment process as shown in FIG. 1, such fluid mixture may be efficiently and effectively treated for remediation of the $H_2S$ and other contaminants. After being combined with the treatment composition in the mixing chamber 102 and being discharged from the outlet 108 the fluid mixture may continue to flow in a pipeline toward another pipeline that will send the fluid mixture to a refinery, e.g., typically for many miles and over a period of hours, the treatment composition will react with and remediate the $H_2S$ and other contaminants in both the liquid and gaseous components of such fluid mixture such that the content of these contaminants will be reduced to appropriate levels by the time the fluid mixture arrives at the pipeline leading to the refinery, and very importantly essentially no precipitates will be discharged from the treated fluid due in large part to the presence of the organic acid(s) such as fulvic acid and humic acid in the treatment composition. Discharge of any amount of precipitate(s) from the treated fluid is very undesirable as this may partially or completely clog the pipeline, and would require the pipeline to be shut down for corrective action. The inventor has determined that even if the contaminated fluid mixture initially contained a relatively high content of $H_2S$, e.g., 40,000 ppm or higher, the content of the $H_2S$ in the liquid portion of the mixture, e.g., crude oil, may be reduced down below 5 ppm and the content of the $H_2S$ in the gaseous portion of the mixture, e.g., natural gas, may be reduced down below 20,000 ppm through this treatment process.

The treatment compositions such as disclosed in PCT/US2018/064015 and U.S. Pat. No. 10,913,911 as well as variations thereof, are appropriate for treating the contaminated fluid mixture. PCT/US2018/064015 discloses a concentrated aqueous hydroxide solution with 35-55 wt % of one or more hydroxide compounds as the main component, e.g., at least 80 wt % and preferably at least 90 wt %, of the new treatment composition, together with a small amount, e.g., 0.1-2 wt % of an organic acid such as fulvic acid or humic acid, and possibly a small amount of MEA, e.g., 0.1-3 wt %, and perhaps an antibacterial compound such as potassium silicate. The concentrated hydroxide compound(s) react with $H_2S$ to remediate same, while the organic acids such as fulvic acid and humic acid function to prevent any precipitates from being generated and released from the treated fluid, and MEA functions as an anti-scaling agent. On the other hand, the treatment composition disclosed in U.S. Pat. No. 10,913,911 may also be an aqueous solution primarily including a high concentration of hydroxide compound(s), e.g., 35-55 wt % of one or more hydroxide compounds as the main component, e.g., at least 80 wt % and preferably at least 90 wt %, of the treatment composition, together with a small amount, e.g., e.g., 0.5-4 wt %, of ethylenediaminetetraacetic acid or EDTA (C10H16N2O8) which is a type of chelating agent that, among other things, helps to improve molar reactivity of the hydroxide compound(s) and helps to prevent formation of precipitates, and possibly smaller amounts, e.g., 0.01-0.1% volume, of a surfactant such as sodium lauryl sulphate and a buffering agent such as potassium carbonate, etc. The pH of such treatment compositions according to the present invention is approximately 14.

The inventor has determined that treatment compositions may also include a small amount, e.g., 0.1 to less than 5 wt % and preferably less than 2 wt %, of a polymer which can help to prevent any salts in the fluids being treated from precipitating out of the treated fluids and/or include 0.1 to 8.0 wt % of sodium sulfide ($HNa_2S$) or its hydrate $Na_2S \cdot 9H_2O$, both of which are colorless solids to help reduce total sulfur content of the contaminated fluids. An example of such a polymer is a commercially available anionic polymer identified under product code 3640. The inventor believes that such polymer and other similar polymers may encapsulate the salts within the fluids being treated and this prevents or helps to prevent the salts and other contaminants from precipitating out of the treated fluids. While it may seem counter-intuitive to add sodium sulfide for the purpose of reducing sulfur content of the contaminated fluids, the present inventor has discovered that addition of sodium sulfide or its hydrate to the treatment compositions can help to reduce total sulfur content in various contaminated fluids, including liquids and gasses being treated with the treatment compositions. Particularly, the inventor has discovered that in the treatment compositions sodium sulfide promotes reactions with sulfur and sulfur containing compounds whereby the sulfur is largely converted to sulfur dioxide ($SO_2$) which is generally released from the treated fluids in gaseous form at standard temperature and pressure (STP), although including the sodium sulfide in the treatment compositions may also cause the formation and release of comparatively smaller amounts of a sulfur containing precipitate, which the inventor has identified using a gas chromatograph as $C_{18}H_8N_4O_5S_2 \cdot SO_2$ is an irritant to humans and would be captured and or further treated, while the precipitate would be removed if and when necessary from a pipeline or other structure in which the treated fluids are contained or flowing. Sodium sulfide and its hydrate readily dissolve in water, e.g., at concentrations of 15-25 wt %, and in the hydrocarbon based liquids used in the treatment compositions of the present invention.

An appropriate amount of such treatment compositions will, of course, be based on the amount of the mixed fluid being treated. For a typical oil well having an output of 5,000-10,000 barrels of crude oil and 10 million to 20 million ft³ of natural gas/day (24 hours) and wherein the H2S content of the mixed fluid at 40,000 ppm or higher, the inventors have inventor has found that an appropriate amount of treatment composition may be in a range of 5 to 20 gallons of treatment composition added per hour or 120-480 gallons per day. Under these conditions the treated crude oil in the mixed fluid will have less than 5 ppm H2S and often 0 ppm H2S, while the treated natural gas in the mixed fluid will have less than 20,000 ppm H2S, which is appropriate to make the gas saleable and acceptable for pipeline delivery to a refinery. Further, it should be noted that the pipelines through which the mixed crude oil and natural gas flow often have bacterial growing therein, e.g., which is attached to the walls of the pipeline, and that such bacterial may be a problem because such bacteria can help $H_2S$ and other sulfur-based contaminants remain in or become regenerated in the mixed fluid. Hence, the amount of treatment composition which is added to mixed crude oil and natural gas according to the present invention may initially be at a higher rater within the discussed range of 5 to 20 gallons of treatment composition added per hour so that the treatment composition may kill the bacteria, and after a period of time sufficient to kill the bacteria the dosage rate may be reduced to a lower value within the range. For a static, non-flowing volume of fluid mixture, the treatment composition may be added in a dosage amount proportional to the volume of fluids being treated as compared to the 5 to 20 gallons of treatment composition added per hour for the flowing mixture of crude oil and natural gas in the amounts discussed above, although dosage amounts may be increased for various reasons, including if the fluid mixtures are highly contaminated, if faster remediation times are desired, etc.

Although the example given above is for a flowing mixture of crude oil and natural gas, the present invention is not limited to this, but may be used to remediate any contaminated fluid mixture in continuous and non-continuous manners. For treatment in a non-continuous manner the treatment composition may be added to the fluid mixture and then the combination of the fluid mixture and the treatment composition may be allowed to react for an appropriate time period, e.g., 15-120 minutes, and the treatment mixture may be agitated and/or heated to help enhance contact between the treatment composition and the fluid mixture.

A significant discovery by the inventor relating to the treatment processes according to the present invention is that when the water based treatment composition(s) are added to a contaminated fluid mixture stream it is very important to control and monitor pH of the mixed fluid stream being treated in order to prevent formation and/or release of precipitates therefrom. A typical fluid mixture extracted from an oil/gas well may have an initial pH value of 5-6, but due to the highly alkaline nature of the water based treatment composition(s) the pH of the mixed fluid stream will increase when the treatment composition(s) are added thereto, particularly in small, localized pockets of the fluid stream where the hydrocarbon liquid based treatment composition(s) are added to the stream. Typically the final pH of a fluid stream treated according to the present invention may be around 7.0-7.3, but as the treatment compositions are added to pockets of the fluid stream, these fluid mixture in such pockets will temporarily spike to much higher pH values which can cause formation and release of precipitates from these pockets. The inventor has discovered that when using the water based treatment composition(s) for treating the mixed fluid stream, it is control the pH of the treated mixed fluid stream, including pockets of the fluid stream, to be kept below value of about 10 to avoid concern for causing formation and/or release of precipitates from the mixed fluid stream. As discussed in PCT/US2021/058610, the inventor previously discovered that the pH of the treated fluid stream should not be increased to a value above about 10, even in small, localized pockets of the fluid stream where the water based treatment composition(s) are added to the stream, in order to prevent formation and/or release of precipitate(s) from the mixed fluid stream.

For appropriately controlling pH of the mixed fluid stream in the treatment process of the present invention, it is also advantageous to add or inject the treatment composition to the mixed fluid stream in multiple smaller dosages and/or at multiple locations and/or at different times, so that no portion of the treated fluids will experience even a temporary pH increase above 10.5 because this may result in release of precipitates. In other words, it is desirable that the entire dosage amount of the water based treatment composition should not be injected at a single location and/or at a single time as this may likely result in the pH of the mixed fluid stream, or the pH of a pocket of the mixed fluid stream, being raised above 10.5 temporarily. Even a temporary increase in the pH above 10.5 may cause undesirable formation and/or release of precipitates from the treated fluid stream. The specific dosage amounts may be determined based on pH of the mixed fluid stream, which may also be monitored at multiple locations along the flowpath of the mixed fluid stream. The pH of the treated mixed fluid stream generally corresponds to the remaining, non-reacted amount of the treatment composition remaining in the mixed fluid stream, and correspondingly such monitoring of the pH allows for further appropriate dosage amount(s) of the treatment composition to be added to the mixed fluid stream, if necessary, as it continues to flow toward a refinery or other destination. By adding smaller dosage amounts of the treatment composition at multiple locations of the mixed fluid stream and/or at different times desirably permits more of the treatment composition to be added to the mixed fluid stream without concern for causing formation and/or release of precipitates.

Treatment Process For Removing Most of the Contaminants From Contaminated Gasses Using Modified Water Wash A second aspect and embodiment of the present invention pertains to a novel treatment process for efficiently and cost effectively removing most of essentially all contaminants that are often present in contaminated gasses, including natural gas from a well which may contain significant amounts of salts, $CO_2$, $H_2S$, other sulfur based contaminants including mercaptans and thiophenes, and metals, natural gas which has been partly treated according to the first aspect and embodiment of the present invention discussed herein, combustion gasses from fossil fuels which typically have high concentrations of $CO_2$ and $SO_2$, $NH_3$, gas streams including water vapor with salts and metals therein, etc., no matter what amounts of contaminants are in the gasses. This treatment process is based on the inventor's discovery that if a water wash is modified to be alkaline with an elevated pH above 8, and preferably in a range from above 8 to about 11, by addition of one or more alkaline substances including hydroxide compounds, such an alkaline water wash is a surprisingly, extremely effective treatment composition for removing most of essentially all contaminants from the contaminated gasses when the gasses are bubbled or otherwise passed through the alkaline water wash with a contact time in a range of 0.5-10 seconds, preferably at least 1.5 seconds. Based on substantial experimentation, the inventor has determined such a treatment process using the alkaline water wash according to the second embodiment and found that it is surprisingly, extremely effective at removing most of the salts, $CO_2$, $H_2S$, other sulfur based contaminants including mercaptans and thiophenes, $NH_3$, and metals from the contaminated gasses, and if the alkaline water wash solution is regularly replaced or refortified to maintain its potency/effectiveness, it can be efficiently used to remove most of the contaminants from various contaminated gas streams, including highly contaminated gas streams, in a practical, cost effective manner.

Various alkaline substances may be added to the water wash to increase its pH to a desired value of about 11. These include one or more hydroxide compound(s), e.g., potassium hydroxide (KOH), ammonium hydroxide ($NH_4OH$), lithium hydroxide (LiOH), magnesium hydroxide ($Mg(OH)_2$), and manganese hydroxide ($Mn(OH)_2$, $Mn(OH)_4$), etc. all of which are readily soluble in water. Thus, for example, if KOH is added to the water wash for increasing the pH of water from about 7 up to about 11, the inventor has found that this may be achieved by combining an amount of a concentrated (45 wt %) aqueous solution of KOH with an amount of water at a ratio of about 1:7 to 1:8, or by adding equivalent amounts KOH powder or KOH hydrate flakes to the water. NaOH could also be used as one of the hydroxide compounds in the water wash, but is not preferred because salts are a main type of contaminant which are sought to be removed in the alkaline water wash, whereas Na is also a main component of NaCl salt. $NH_4OH$ is an appropriate compound for increasing the water wash pH, but should not be the only compound used for such purpose because it may release ammonia ($NH_3$) into the gas being treated, whereas there are governmental limits on the amounts of $NH_3$ contained in gasses, e.g., natural gas should contain no more than 14 ppm of $NH_3$. Thus, for example, a larger amount of KOH or LiOH could be used together with a smaller amount of $NH_4OH$ for increasing the water wash's pH. $NH_4OH$ not only functions effectively in the alkaline water wash solution as gas is bubbled through the solution, but also favorably increases the vapor pressure of the alkaline water wash so that contaminants remaining in the treated gas after it passes through the water wash may be further remediated by $NH_4OH$ vapors in the head space above the water wash in a reactor. Other substances which may optionally be added to the water wash to improve its effectiveness and/or stability at removing contaminants from gasses include smaller amounts, e.g., less than 1% by volume, of a surfactant such as sodium lauryl sulfate or commercially available anionic polymers, a buffering agent such as phosphoric acid ($H_3PO_4$), etc.

Water is generally effective for removing salts from contaminates gasses because the salts are very soluble in water and easily pass from the gasses to the water when the gasses contact the water in the water wash. However, the inventor has discovered that if the water of the water wash is made alkaline with a pH above 8 by the addition of alkaline substances such as hydroxide compounds, then the water wash becomes surprisingly, much more effective at removing essentially all of the salts from the gasses, and also becomes very effective at removing significant amounts of $H_2S$ and other sulfur based contaminants $CO_2$, and metals from the gasses. For example, the inventor has discovered that if the pH of the water wash is increased to a level of around 11 by the addition of alkaline substances such as hydroxide compound(s), and a gas highly contaminated with $H_2S$, $CO_2$, $SO_2$, salts, etc. is passed through the alkaline water wash solution with an appropriate contact time in a range of 0.5-10 seconds, and preferably at least 1.5 seconds: 1) essentially all of the salts pass from the gas into the water wash and/or precipitate out of the water wash; 2) much of the sulfur based contaminants in the gas, including $H_2S$, $SO_2$, mercaptans and thiophenes, are remediated by reacting with the alkaline substances such as hydroxide compound(s) added to the water wash and then precipitate out of the gas and/or the water wash as elemental sulfur and/or sulfur compounds generated by such remediation reactions; 3) much of the carbon based contaminants in the gas, including $CO_2$ and CO, are remediated by reacting with the alkaline substances such as hydroxide compound(s) added to the water wash and then precipitate out of the gas/alkaline water wash, e.g., as carbonate crystals; and 4) much of the metal contaminants in the gas also react with the alkaline substances such as hydroxide compound(s) added to the water wash and then precipitate out of the gas/alkaline water wash, e.g., as metal sulfides. If the content of each of $H_2S$, $SO_2$ and $CO_2$ in the gas are 30,000 ppm or more before the water wash, after passing through the alkaline water wash the content of each of these may be reduced to be in a range of approximately 5,000 ppm or less. Note that contaminants including $H_2S$, $SO_2$ and $CO_2$ may be present at 60,000 ppm, 100,000 ppm, and several hundred ppm in the contaminated gasses.

Salts are removed from the gasses when they pass through the alkaline water wash because salts are very soluble in the alkaline water wash, and once the water wash is saturated with the salts they will precipitate out of the water wash as salt crystals. Apart from removal of salts, there are several reactions between the hydroxide compound(s) in the alkaline water wash and the various contaminants in the gasses which cause the other contaminants to be remediated and/or removed as the gasses pass through the water wash, including reactions with $H_2S$, $CO_2$, metals including Fe, Al, Cr, V, etc. In low redox conditions under which natural gas is formed and a pH range of 8-11 of the alkaline water wash, metal hydroxides and metal sulfides are favored and will precipitate out until or unless there is substantial carbonate absorbed from the $CO_2$ after which metal carbonates may precipitate out. If KOH is used for increasing the pH of the water wash, KOH will react with $H_2S$ and remediate it to form potassium sulfide ($K_2S$) according to the following equation:

$$KOH + H_2S \rightarrow K_2S + H_2O \qquad (1)$$

$K_2S$ is highly soluble unlike metal sulfides. If metals, e.g., Fe, Al, V, etc., are present in the contaminated gasses metal sulfides including these metals will also precipitate out of the alkaline water wash. The speciation and solubility of metals is a function of pH, redox potential, carbonate content, and concentration of metals and salts. $CO_2$ may be removed from the contaminated gasses by contact with the alkaline water wash according to the following reactions which form bicarbonate crystals, and by other reactions:

$$CO_2 + OH^- \rightarrow HCO_3^- \qquad (2),$$

$$K^+ + HCO_3^- \rightarrow KHCO_3 \qquad (3)$$

In test trials of the treatment process according to the second embodiment of the present invention, as salt collected in the alkaline water wash and the briny water absorbed $CO_2$, then potassium bicarbonate ($KHCO_3$) crystallized out of solution. Similar reactions occur if other hydroxide compounds besides KOH are used in the alkaline water wash.

While the upper range for the pH of the alkaline water wash according to the second embodiment is about 11, in fact the pH of the water wash could be increased above 11 by addition of greater amounts of alkaline substances such as hydroxide compounds and such alkaline water wash solution would also be very effective at removing most of the contaminants from the contaminated gasses. However, as a practical matter in terms of cost, it takes proportionally much more of such alkaline substances to increase the water wash pH above 11 than it takes to increase the pH of the water from around 7 up to 11, so that an upper limit of about 11 is best for cost efficiency. On the other hand, the alkaline water wash solution becomes less and less effective at remediating and removing contaminants from gasses the more it is used, which is reflected by a reduction in the water wash pH, whereby the alkaline water wash may need to be changed regularly to maintain its effectiveness at remediating and removing contaminants from gasses. For example, the inventor has determined through significant testing that the alkaline water wash becomes less and less effective at remediating contaminants in the gases and/or causing them to precipitate from the gas/water wash for removal when the pH of the water wash drops below 10, e.g., when the pH of the alkaline water wash drops to about 9.5 some $H_2S$ and $CO_2$ will remain in the treated gasses, when the pH drops below 9 the alkaline water wash's ability to remediate and remove contaminants from gasses is significantly reduced from its original ability at a pH of 10 or above, and at a pH of about 8 the alkaline water wash's ability to further remediate and remove contaminants from gasses is essentially depleted-spent, even if the various precipitates being released from the treated gas and the water wash are removed on a continuous or somewhat continuous basis from the water wash. Thus, the alkaline water wash solution could be most effective at removing contaminants from contaminated gasses, possibly close to 100% effective, if the solution is replaced whenever its pH drops to a value below 10, but this would not be the most practical, cost effective process of using the water wash solution for removing contaminants. The inventor has found that the most practical, cost efficient process of using the alkaline water wash solution is to initially increase the pH up to about 11 by the additional of alkaline substances such as hydroxide compounds, then use such solution to remove contaminants from a flow of the contaminated gas until the solution's pH drops to between 9 and 8, and then replace the solution with fresh solution having a pH of about 11, while repeating these steps as often as necessary.

With reference to FIG. 2, depicted is a schematic diagram of a water wash type reaction chamber which may be used in a treatment process according to the second embodiment of the present invention for removing most of the contaminants from a contaminated gas. As shown in FIG. 2, a reaction chamber such as a bubble tower 200 may be used to contain an amount of alkaline water wash solution 202 having a pH of about 11 which fills much of the reaction chamber while an upper portion of the chamber defines a head space 204 above the solution 202. The size of the reaction chamber 200 may depend on the amount of contaminated gasses being treated and/or the amount of contaminants contained in the gasses that are to be remediated and removed via the alkaline water wash solution. For example, if a large continuous volume of contaminated gas is to be treated in the reaction chamber, such as natural gas output from a well at three (3) to fifteen (15) million $ft^3$/day, the reaction chamber may be four (4) feet in diameter and twenty (20) feet tall with a volume of 1880 US gallons, wherein the solution 202 may fill ¾ of the volume or 1410 gallons. Contaminated gas 205 may be controlled to flow into a bottom portion of the reaction chamber based on Stokes Law for bubble formation and bubble rise with a desired liquid contact time, e.g., 0.5 to 10 seconds and preferably at least 1.5 seconds. This may involve a discharge nozzle 206 having numerous small discharge openings defined therein, and may also involve some type of means for disrupting the flow of the gas through the reaction chamber so that the gas cannot flow uninterrupted through the water wash solution in a stream or as large bubbles, and will thereby have much more surface area for reacting with the treatment composition. Such disrupting means may involve packing the reaction chamber or portions thereof with a fine, non-reactive media, e.g., stainless steel wool, pea gravel, perforated plates, etc., through which the natural gas will pass as it flows through the water wash solution.

As the gas passes through the alkaline water wash solution most of the contaminants therein will be removed as discussed above, and then the treated gas may pass through a baffle 208 or the like which can be provided in the head space 204 to help to remove some of the alkaline water wash solution remaining in the gas, and finally the treated gas is discharged from the reaction chamber at an upper portion 210 thereof. Water and treatment chemicals such as hydroxide compounds may be introduced into the reaction chamber through inlets 212, 214 to form the alkaline water wash solution, a level sensor 215 may be used to set and control the level of solution 202 in the reaction chamber and a sensor 216 may be used to monitor pH of the solution 202. As a flow of the contaminated gas is passed through the alkaline water wash solution in the reaction chamber, the alkaline chemicals such as hydroxide compound(s) in the solution will react with contaminants in the gas, the pH of the solution will be progressively reduced, the solution will become saturated with contaminants such as salts, and eventually precipitates including salt crystals, metal sulfides, carbonate crystals will be released from the solution and may collect in a bottom of the reaction chamber. Once the pH of the solution drops to between 9 and 8 the solution is considered spent according to the treatment process and the spent solution and any precipitates released from the solution may be removed, e.g., through a waste discharge outlet 218 at the bottom of the reaction chamber. Another volume of the alkaline water wash solution may then be introduced into the reaction chamber, and the treatment process may continue by repeating these steps as long as desired. The treatment process may be automated using a controller 220 such as a programmed ECU which receives inputs from sensors 215, 216 and controls the flow of solution and gas into and from the reaction chamber 200 by opening and closing various solenoid operated valves associated with the respective various inlets and outlets of the reaction chamber 200. The spent water wash solution and precipitates may be discarded in an appropriate manner, or depending on the economics of the situation some of the precipitates may recovered, purified and sold.

As will be appreciated the treatment process using the alkaline water wash solution according to the embodiment of the present invention can be effectively and economically used for removing contaminants from a variety of contaminated gasses. The natural gas industry is major example, again, noting that there no known, conventional process prior to the present invention that can effectively treat some of the highly contaminated natural gas from existing wells and known deposits in the earth in a practical, cost effective manner, such that there are many capped wells and untapped deposits around the world. Another type of contaminated gas that many be efficiently and cost-effectively treated using the alkaline water wash solution according to the embodiment of the present invention are combustion gasses from fossil fuels such as coal, and petroleum based liquids and gasses, which typically include large amounts of $CO_2$, $SO_2$, etc. as used in various industries including electricity producing plants. Thus, for example, this treatment process may be cost-effectively used as a carbon sequestration/carbon mitigation strategy, noting that if a power plant burning fossil fuels continuously outputs combustion gasses containing 80,000 ppm of $CO_2$ at thirteen (13) million $ft^3/day$ is treated using the treatment process this will remove 57,058 kg or 63 tons/day of $CO_2$ from the gasses. Currently, governments award industries carbon credits for reducing emissions of $CO_2$, and such credits can amount to substantial money. The same reasoning applies to $SO_2$ and other contaminants commonly contained in gasses.

New Hydrocarbon Liquid Based Treatment Compositions and Treatment Process For Contaminated Gasses Using the New Hydrocarbon Liquid Based Treatment Compositions A third embodiment of the present invention also pertains to treatment of contaminated gasses, including natural gas from a well, natural gas which has been partly treated according to the first and/or second embodiments of the present invention discussed herein, combustion gasses from fossil fuels which typically have high concentrations of $CO_2$ and $SO_2$, gas streams including water vapor with salts and metals therein, etc., and is particularly effective and cost efficient for completely removing and/or remediating all contaminants including $H_2S$, $CO_2$, and metals, etc. in gasses when used in combination with a treatment process involving an alkaline water wash according to the second embodiment discussed herein.

New hydrocarbon liquid based treatment compositions according to exemplary embodiments of the present invention include one or more hydrocarbon based liquids and a relatively high collective concentration of one or more hydroxide compounds dissolved or dispersed into the hydrocarbon based liquid(s), e.g., 30-45 wt %, and optionally one or more other components as discussed herein. The hydrocarbon based liquids used in the new treatment composition(s) give the treatment composition an increased vapor pressure compared to the inventor's previously proposed water based treatment compositions. The inventor has determined that such treatment compositions can be more effective and efficient at remediating $H_2S$ and other contaminants in various contaminated fluids, both liquids and gasses, and mixtures of the contaminated fluids in some situations in comparison to the inventor's previously proposed water based treatment compositions, including those discussed herein, and the new hydrocarbon liquid based treatment compositions may be more effective at preventing formation and release of precipitates from the treated fluids in comparison to the inventor's previously proposed water based treatment compositions, which can be very important. The new treatment compositions are effective for remediating contaminants in the treated fluids over a wide range of temperatures, e.g., −30° C. to 300° C., and over a wide range of pressures, e.g., from pressures below atmospheric pressure to several atmospheres, including at STP. Also, the new treatment compositions The new treatment compositions including the hydrocarbon based liquids are significantly different from the inventor's previously proposed treatment compositions which are water based liquid compositions not including any hydrocarbon based liquids. However, other components of the treatment compositions may be the same or similar to components included in the inventor's previously proposed water based treatment compositions.

For example, the new treatment composition may also contain various amounts of water, from little or none up to 50 wt % of water, and the water may be helpful for readily dissolving or dispersing the hydroxide compound(s) and other optional components into the hydrocarbon based liquids. If the new hydrocarbon liquid based treatment compositions also include some amount of water, even a significant amount, of water, the inventor has determined that for remediating some contaminated fluids or fluid mixtures, the new compositions may still be more effective and efficient at remediating $H_2S$, $CO_2$ and some other contaminants, and for preventing formation and release of precipitates in various contaminated fluids and mixtures of the contaminated fluids in comparison to the inventor's previously proposed water based treatment compositions. Further, when treating contaminated crude oil and contaminated natural gas from a well, these will typically include some amount of water therein, so that including additional water in the treatment compositions may be appropriate. Such treatment compositions containing both the hydrocarbon liquid(s) and water will still have a significantly higher vapor pressure than the inventor's previously proposed treatment compositions which do not include hydrocarbon based liquid(s). Presence of water in the treatment compositions may increase the possibility of precipitates being released from the fluids being treated in some situations. Hydroxides tend to bond more strongly to water than to hydrocarbon liquids, and when the new treatment compositions are added to contaminated fluids containing water together with salts and/or other contaminants dissolved or dispersed in the water, the hydroxides bonded to the water may cause salts and other contaminants to be released from the treated fluids.

Whether the treatment compositions include the other chemical compounds may depend on the specific characteristics of the contaminated fluids being treated and desired results, including whether or not formation and release of precipitates from the treated fluids is desired to occur or be prevented. Other possible components of the treatment compositions include: one more organic acids such as fulvic acid and humic acid; polymers such as an anionic polymer with product code 3640; chelating agents such as EDTA; and sodium sulfide ($HNa_2S$). For example, the new treatment compositions may include 0.01 to 6 wt % collectively of one or more organic acids such as fulvic acid and humic acid, which the inventor has discovered are very effective for preventing substances that are formed from the remediated $H_2S$, as well as other contaminants, from precipitating out of the treated fluids. Use of such organic acids is further discussed in PCT/US2018/064015, and in U.S. Pat. No. 10,913,911 relative to the inventor's previously proposed water based treatment compositions, but the discussion also applies to the new treatment compositions.

The treatment compositions may include 0.01 to 6 wt % of a chelating agent such as ethylenediaminetetraacetic acid (EDTA). Among other things, EDTA increases the efficiency of hydroxide compounds in remediating $H_2S$ and helps to make the remediation of $H_2S$ using the new treatment irreversible. However, if the fluids being treated include significant amount of salt(s), amounts of EDTA in the higher end of the discussed range may react with the salt(s) to form a gel which precipitates out of the treated fluids, which would typically be undesirable because the gel could cause blockages of pipelines in which the fluids are flowing and would have to be removed. Further, if the gel remains in a pipeline or other device through which the fluids are flowing or being transported over an extended period of time the gel may solidify making removal of the gel more difficult.

The treatment compositions may also include a small amount, e.g., 0.1 to less than 5 wt % and preferably less than 2 wt %, of a polymer which can help to prevent any salts in the fluids being treated from precipitating out of the treated fluids. An example of such a polymer is a commercially available anionic polymer identified under product code 3640. The inventor believes that such polymer and other similar polymers may encapsulate the salts within the fluids being treated and this prevents or helps to prevent the salts and other contaminants from precipitating out of the treated fluids.

The treatment compositions may also include 0.1 to 8.0 wt % of sodium sulfide ($HNa_2S$) or its hydrate $Na_2S \cdot 9H_2O$, both of which are colorless solids. While it may seem counter-intuitive to add sodium sulfide for the purpose of reducing sulfur content of the contaminated fluids, the present inventor has discovered that addition of sodium sulfide or its hydrate to the treatment compositions can help to reduce total sulfur content in various contaminated fluids, including liquids and gasses being treated with the treatment compositions. Particularly, the inventor has discovered that in the treatment compositions sodium sulfide promotes reactions with sulfur and sulfur containing compounds whereby the sulfur is largely converted to sulfur dioxide ($SO_2$) which is generally released from the treated fluids in gaseous form at standard temperature and pressure (STP), although including the sodium sulfide in the treatment compositions may also cause the formation and release of comparatively smaller amounts of a sulfur containing precipitate, which the inventor has identified using a gas chromatograph as $C_{18}H_8N_4O_5S_2$. $SO_2$ is an irritant to humans and would be captured and or further treated, while the precipitate would be removed if and when necessary from a pipeline or other structure in which the treated fluids are contained or flowing. Sodium sulfide and its hydrate readily dissolve in water, e.g., at concentrations of 15-25 wt %, and in the hydrocarbon based liquids used in the treatment compositions of the present invention.

A surfactant such as sodium lauryl sulphate and a buffering agent such as potassium carbonate may be included in small amounts, e.g., less than 1 wt %, in the new treatment compositions.

By using a hydrocarbon based liquid as a base solvent for the new treatment compositions, the vapor pressure of the treatment compositions at STP will be greater than the vapor pressure of the inventor's previously proposed water based treatment compositions at STP. Correspondingly, more of the treatment composition will be in vapor phase and may correspondingly have greater contact with contaminants including $H_2S$ and $CO_2$, which tend to be in vapor phase at STP, even when the $H_2S$ and $CO_2$ are in a fluid mixture containing liquid and gaseous fluids. Thus, the new compositions can more effectively and efficiently remediate the contaminants that tend to be in gaseous or vapor phase at STP including $H_2S$ and $CO_2$. When contaminated fluids such as crude oil, produced water and natural gas are extracted from the earth though a well, the fluids may be at a temperature of 90 to 120° F. by the time the fluids reach the earth's surface, but as the fluids flow through a pipeline toward a separator, refinery or other destination they will cool down to ambient temperature surrounding the pipeline, such that it is important that the treatment composition can be effective at remediating contaminants including $H_2S$ and $CO_2$ at STP. The new treatment compositions are effective for remediating $H_2S$, $CO_2$ and other contaminants in contaminated fluids at STP, but the remediation reaction(s) in treatment processes involving the treatment compositions may proceed more quickly at elevated temperatures.

A wide variety of hydrocarbon based liquids may be used in the new treatment compositions, including relatively light liquid(s) including alcohols, toluene, hexane, xylene, and other hydrocarbon based liquids having vapor pressures greater than water, as well as mixtures of these liquids, provided that the hydroxide compound(s) and other possible components of the treatment compositions may be dissolved of dispersed therein. Alcohols are appropriate for use as the hydrocarbon liquids because they are polar so that other components of the composition are generally readily dissolvable and/or miscible therein. Lighter alcohols, including methanol ($CH_3OH$), ethanol ($C_2H_5OH$), and n-propyl alcohol ($C_3H_8O$), may be more appropriate based on lower cost and/or higher vapor pressure. Toluene, hexane, xylene and other such liquids which are often used as solvents may also be used as the hydrocarbon liquids as they have relatively high vapor pressures which is desirable because more of the reactive hydroxide compound(s) may be contained in the vapors where they can better react with gaseous contaminants including $H_2S$ and $CO_2$. Hydroxide compounds and other possible components of the treatment compositions may also dissolve or disperse into these liquids. It is important that components of the composition other than the hydrocarbon liquid(s) should be dissolvable, dispersable and/or miscible in the hydrocarbon based liquid(s) used in the treatment composition as there should be no precipitates or the like from the treatment composition itself when used in the treatment processes of the present invention.

Generally, all hydroxide compounds may be used provided they can be dissolved or dispersed in the hydrocarbon liquid(s) of the all composition. However, some hydroxide compounds have lower cost. e.g., NaOH and KOH, and if used may make the composition and treatment processes using the composition more economically advantageous. If the treatment composition is to be used to treat fluids such as crude oil and/or natural gas which include significant amounts of salts including NaCl, which will typically be dissolved in any water included in the fluids, it may be desirable to use little or no NaOH to help prevent causing any salt to precipitate out of the treated fluids. The treatment composition may include 30-50 wt % collectively of one or more hydroxide compound(s).

Including water together with the hydrocarbon based liquids in the treatment compositions of the present invention may facilitate dissolving or dispersing the hydroxide compounds and other possible components into the new compositions. However, if it is desired that the treatment compositions contain little or no water, the hydroxide compound(s) and other possible components may be directly dissolved and/or dispersed in the alcohol(s) or other hydrocarbon based liquid(s) liquid used as the solvent/base of the treatment composition. For example, the hydroxide compound(s) may be in the form of hydrates such as KOH hydrate and NaOH hydrate, which are solid materials, while the organic acids such as fulvic acid and humic acid, chelating agents such as EDTA and sodium sulfide or its hydrate may also be in forms of a solids or powders, all of which readily dissolve in alcohols and the other discussed hydrocarbon based liquids which may be used in the new treatment compositions. Polymers such as the 3640 polymer are readily dispersed in alcohols. By dissolving and/or dispersing the hydroxide compound(s) and other components directly in the alcohol(s) and/or other hydrocarbon liquid(s) used as a base for the treatment composition, this can keep the amount of water in the treatment composition down to minimum levels such as 5 wt % or less. The less amount of water in the treatment compositions the more effective and/or efficient the treatment compositions may be for remediating some contaminated fluids.

However, the inventor has discovered that even if the new treatment compositions include significant amounts of water, e.g., up to about 50 wt %, together with the hydrocarbon based liquids, the treatment compositions may still be very effective at remediating $H_2S$, $CO_2$ and other contaminants in various contaminated fluids and mixtures of contaminated fluids. For example, if the hydroxide compound(s) and other possible components including organic acids such as fulvic acid and humic acid, chelating agents such as EDTA, sodium sulfide, etc. are initially dissolved or dispersed in water, then the water solution(s) containing these materials may be mixed together with the alcohol(s) and/or other hydrocarbon liquid(s) used as the base of the treatment compositions, and the resulting treatment compositions may still be very effective and efficient at remediating $H_2S$, $CO_2$ and other contaminants in various contaminated fluids and fluid mixtures, as well as for preventing formation and release of precipitates from the treated fluids. When the treatment composition include water, e.g., to facilitate dissolving or dispersing the hydroxide compounds and other components into the treatment compositions, the water content may be reduced or minimized by dissolving of dispersing the hydroxide compound(s) and other components at relatively high concentrations in the water. Hydroxide compositions such as NaOH and KOH may be dissolved at high concentrations of 35-55 wt % in water, while organic acids such as fulvic acid and humic acid, and chelating agents such as EDTA may also be dissolved at concentrations above 40 wt % in water.

A treatment process according to the inventor's third discovery may involve an alkaline hydrocarbon liquid based treatment composition having a pH of about 14 and through which contaminated gasses are passed with a contact time of 0.5-10 seconds, and preferably at least 1.5 seconds. The hydrocarbon liquid based treatment composition may be considered spent and should be replace or re-fortified when its pH drops from an initial value of 14 to a value between 9-10.

It is very important aspect of the treatment composition according to the third embodiment that it is hydrocarbon liquid based rather than water based, such as the inventors' previously proposed treatment compositions discussed in PCT/US2018/064015 and the '911 patent. Alcohols such as methanol, ethanol, and isopropyl alcohol have a much higher vapor pressure than water, whereby this new treatment composition will have a much higher vapor pressure than the previously proposed treatment compositions, and based on this can more efficiently remediate gaseous contaminants in the gasses being treated. For example, because of its much higher vapor pressure, in a reaction chamber partly filled with the liquid treatment composition there a significant amount of vapors of the treatment composition will accumulate in the head space within the reaction chamber above the liquid composition, particularly if the treatment composition is at standard temperature and pressure of about 25° C. and one atmosphere. Such composition vapors will contain some of the alkaline substances such as hydroxide compound(s) and these will continue to react with and remediate any gaseous contaminants remaining in the gas after it has passed through the liquid treatment composition, whereby complete remediation of the contaminating gasses such as $H_2S$ and $CO_2$ can be achieved. Also, vapors and gasses mix very well together, much more so than gasses and liquids, such that there is greater contact between the gaseous contaminants and the treatment composition vapors in the head space of the reaction chamber, which leads to more efficient remediation of the contaminants and a prolonged useful life of the alcohol based treatment composition in remediating the contaminants in the gasses. Such contact between contaminants in the gasses and the vapors of the treatment composition is different from contact between contaminants in the gasses and liquids which are sprayed or injected into the gasses in atomized, fine droplets. The contact between the contaminants in the gasses and the vapors of the treatment composition is much greater than contact between the contaminants in the gasses and fine, atomized, liquid droplets because the vapor molecules are much smaller than the fine liquid droplets, and this results in more effective and efficient remediation of the contaminants. Preferably, the alcohol based treatment composition will contain less than 1 volume % water.

For purposes of minimizing the amount of water contained in the hydrocarbon liquid based treatment composition, the inventor has determined that an appropriate type of hydroxide compound(s) that may be added to the alcohol base of the composition is hydrated hydroxide compounds, e.g., KOH hydrate, LiOH hydrate, etc. Such hydrated hydroxide compounds typically come in solid form such as flakes, readily dissolve in hydrocarbon based liquids including alcohols such as methanol, ethanol, and isopropyl alcohol, and relatively large amounts of such compounds may be dissolved in such alcohols without forming precipitates of the compounds in the alcohol based compositions, which is helpful for increasing the useful life of the treatment composition. For example, the inventor has determined that if potassium hydroxide monohydrate ($H_3KO_2$) and methanol are to be used for preparing the treatment composition with a pH of 14, this may be achieved by adding at least 333 g of $H_3KO_2$/liter of methanol, but substantially more of $H_3KO_2$ can be added without any of it precipitating out of the composition, e.g., up at least 800 g of $H_3KO_2$/liter of methanol. This corresponds to about a 4.5 to 11.25 molar concentration of $H_3KO_2$ in the treatment composition.

The new treatment composition may include KOH and methanol, and the KOH may be dissolved or dispersed into the methanol produces a methoxide ion ($CH_3O^-$) which is a strong base that is even stronger than $OH^-$, which is the reactive ion in the treatment compositions in the aqueous based treatment compositions discussed in PCT/US2018/064015 and the '911 patent. Potassium Methoxide can react with $H_2S$ according to the following equation:

$$CH_3KO + H_2S \rightarrow K_2S + CH_3OH \qquad (4)$$

Again, the potassium sulfide ($K_2S$) may remain in the treatment composition and does not form any precipitates due to the presence of organic acids such as fulvic acid and humic acid. Further, the hydroxides in the methanol based treatment composition may react with $CO_2$ according to the equations (2) and (3) discussed herein to produce potassium carbonate, but such compound will also remain in the treatment composition due to the presence of organic acids such as fulvic acid and humic acid and will not generate carbonate crystal precipitates provided that the treatment composition does not become excessively saturated with the carbonate compound, which is assured by deeming that the treatment composition is spent when its pH drops to between 10 and 9, and is replaced with fresh treatment composition at a pH of 14. As an alternative formulation of the new treatment composition including methanol, KOH and water the composition may be prepared by initially dissolving appropriate amount(s) of the hydroxide compound(s) in water to form an aqueous hydroxide solution and then combining appropriate volumes of such solution with the methanol. For example, 15-50% volume of methanol may be combined with 50-85% volume of an aqueous solution containing 35-55 wt % of KOH. This exemplary treatment composition also has a pH of about 14.

There is a conventional process known as the Rectisol™ process which uses methanol to absorb $H_2S$. The Rectisol™ process uses chilled methanol, which is chilled at least below freezing point of water and usually much lower temperatures, to absorb and thereby remove $H_2S$ based on solubility of $H_2S$ being greater than other gases such as $CO_2$. This is very different from the inventors' treatment process according to the third embodiment of the present invention which may be carried out at standard temperature and pressure and wherein the methanol based treatment composition does not just adsorb or solubilize the $H_2S$, but instead remediates the $H_2S$ through reactions with methoxide ions.

NaOH or NaOH hydrate could also be used as one of the hydroxide compounds in the alcohol based treatment composition, however it is not preferred because formation and release of any precipitates and scale from the treated natural gas and/or from the alcohol based treatment solution would be undesirable as the precipitates and scale would tend to quickly build up and clog parts of the treatment system and the pipelines which receive the treated gasses. Na is a component of the salt NaCl, and salts are common contaminants that tend to precipitate from treated gasses. $NH_4OH$ is an appropriate hydroxide compound for including with the alcohol based treatment composition, but should not be the only hydroxide compound used because it may release ammonia ($NH_3$) into the gas being treated, whereas there are governmental limits on the amounts of $NH_3$ contained in gasses, e.g., natural gas should contain no more than 14 ppm of $NH_3$. Thus, for example, a larger amount of KOH or LiOH could be used together with a smaller amount of $NH_4OH$ in the treatment composition. $NH_4OH$ not only functions effectively for remediating contaminants in the treatment composition as gas is bubbled through the composition, but also favorably increases the vapor pressure of the treatment composition so that contaminants remaining in the treated gas after it passes through the treatment composition may be further remediated by $NH_4OH$ vapors in the head space above the treatment composition in a reactor. Of course, $NH_3$ may also be one of the main contaminants in a gas which must be removed or remediated, and for such contaminated gasses use of $HN_4OH$ would not likely be appropriate.

A treatment process involving the new treatment composition may involve contacting the contaminated gasses with the hydrocarbon liquid based treatment solution, e.g., a quantity of the treatment composition may be disposed in a bubble tower or other reaction chamber at ambient temperature and pressure and the gas may be bubbled or otherwise passed through the composition such with an appropriate contact time between the gas and the liquid composition, e.g., 0.5 to 10 seconds and preferably at least 1.5 seconds, and wherein there is a headspace above the treatment composition in the bubble tower or other reaction chamber where vapors of the treatment composition and the gasses being treated will contact each other for further, and in most cases completely, remediating any contaminants which may remain in the gases, e.g., $H_2S$ and $CO_2$, before the treated gasses are discharged from the reaction chamber. Again, the hydrocarbon liquid based treatment composition is considered spent and should be replace or re-fortified when its pH drops from an initial value of 14 to a value between 9-10. A reaction chamber such as the reaction chamber 200 in FIG. 2 may be used as a bubble tower type reaction chamber for containing an alcohol based treatment composition according to the third embodiment of the invention, where in a volume of the treatment composition rather than an alkaline water wash solution would fill about ½ to ¾ of the space within the reaction chamber, and the contaminated gas would be bubbled through the treatment composition with an appropriate contact time of 0.5 to 10 seconds. However, in the treatment process involving the hydrocarbon liquid based treatment composition, there would be very little or no precipitates formed and released.

The size of the reaction chamber used may depend on the amount of contaminated gasses being treated and/or the amount of contaminants contained in the gasses that are to be remediated and removed via the alkaline water wash solution. For example, if a large continuous volume of contaminated gas is to be treated in the reaction chamber, such as natural gas output from a well at three (3) to fifteen (15) million $ft^3$/day, the reaction chamber may be four (4) feet in diameter and twenty (20) feet tall with a volume of 1880 US gallons, wherein the treatment composition may fill ¾ of the volume or 1410 gallons. Contaminated gas may be controlled to flow into a bottom portion of the reaction chamber based on Stokes Law for bubble formation and bubble rise with a desired liquid contact time, e.g., 0.5 to 10 seconds and preferably at least 1.5 seconds. This may involve a discharge nozzle having numerous small discharge openings defined therein such as the nozzle 206, and may also involve some type of means for disrupting the flow of the gas through the reaction chamber so that the gas cannot flow uninterrupted through the water wash solution in a stream or as large bubbles, and will thereby have much more surface area for reacting with the treatment composition. Such disrupting means may involve packing the reaction chamber or portions thereof with a fine, non-reactive media, e.g., stainless steel wool, pea gravel, perforated plates, etc., through which the natural gas will pass as it flows through the water wash solution.

Another type treatment process according to the present invention for treating contaminated gasses using alcohol based treatment composition according to the third embodiment is known as a pressure swing absorption (PSA) process. According to an exemplary PSA process a reaction chamber, which may be aligned horizontally, is partially filled with the alcohol based treatment composition such that there is substantial head space in the reaction chamber above the treatment composition, a volume of contaminated gas is introduced into the reaction chamber at elevated pressure, e.g., about 100-120 psi, the reaction chamber is closed for a short period, e.g., around 15-120 seconds, such that vapors of the treatment composition will react with contaminants in the gasses, then the treated gasses are released from the reaction chamber. These steps may repeated with additional volumes of the contaminated gas, and when the treatment composition's pH drops to between 9 and 10 it is considered spent and should be replaced. Such PSA process is generally more effective at completely removing all contaminants from the gasses in comparison to a treatment process involving a continuously operating bubble tower type reaction chamber as discussed herein, but requires more controls and may not be as cost effective as the treatment process involving a continuously operating bubble tower type reaction chamber.

A schematic diagram of an exemplary PSA reaction chamber 300 that may be used according to the third embodiment of the present invention is shown in FIG. 3 As shown in FIG. 3, the reaction chamber may be partly filled with an amount of treatment composition 302 having a pH of about 14 which fills the lower half of the reaction chamber while an upper half of the chamber defines a head space 304 above the treatment composition 302. Again, the size of the reaction chamber 300 may depend on the amount of contaminated gasses being treated and/or the amount of contaminants contained in the gasses that are to be remediated and removed via the alkaline water wash solution. For example, if a large continuous volume of contaminated gas is to be treated in the reaction chamber, such as natural gas output from a well at three (3) to fifteen (15) million ft$^3$/day, the reaction chamber may be four (4) feet in diameter and twenty (20) feet long with a volume of 1880 US gallons, wherein the solution 302 may fill ½ to ¾ of the volume or 940-1410 gallons. For this treatment process much of the remediation of contaminants occurs in the head space 304 where vapors of the treatment composition mix with the gas 305 being treated, so having a head space of ½ or more of the volume of the reaction chamber is appropriate. Contaminated gas 305 may be controlled to flow into a bottom portion of the reaction chamber based on Stokes Law for bubble formation and bubble rise with a desired liquid contact time, e.g., 0.5 to 10 seconds and preferably at least 1.5 seconds. This may involve a discharge nozzle 306 having numerous small discharge openings defined therein, and may also involve some type of means for disrupting the flow of the gas through the treatment composition in reaction chamber such as the disrupting means discussed herein. Alternatively, the gas 305 could be directly introduced into the head space 304 without being bubbled through the treatment composition.

As the gas passes through the treatment composition some of the contaminants therein will be removed as discussed above, and then the contaminants with be further remediated by the vapors of the treatment composition in the head space 304 before the treated gas is discharged from the reaction chamber at an upper portion 310 thereof. The hydrocarbon liquid based treatment composition may be introduced into the reaction chamber through inlet 312, a level sensor 315 may be used to set and control the level of treatment composition 302 in the reaction chamber and a sensor 316 may be used to monitor pH of the composition 302. As a flow of the contaminated gas is remediated in the reaction chamber, the alkaline chemicals such as hydroxide compound(s) in the solution will react with contaminants in the gas, the pH of the composition will be progressively reduced. Although, little or no precipitates will form or be releases into the treatment composition due to the presence of the organic acids such as fulvic acid and humic acid, and or in the composition, once the pH of the solution drops to between 10 and 9 the treatment composition is considered spent according to the treatment process and the spent composition may be discharged, e.g., through a waste discharge outlet 318 at the bottom of the reaction chamber.

Another volume of the treatment composition may then be introduced into the reaction chamber, and the treatment process may continue by repeating these steps as long as desired. The treatment process may be automated using a controller 320 such as a programmed ECU which receives inputs from sensors 315, 316 and controls the flow of solution and gas into and from the reaction chamber 300 by opening and closing various solenoid operated valves associated with the respective various inlets and outlets of the reaction chamber 300. The alcohol in the spent treatment composition may be recovered by distillation or other appropriate manner appropriate manner and reused. Alternatively, to any extend there is still some unreacted hydroxide compound(s) and/or organic acid(s) in the spent treatment composition, the spent composition could be added to produced water extracted from the earth with crude oil and natural gas for the purpose of reducing the content of $H_2S$ and other contaminants in the produced water before it is injected back into the earth. There may be commercial value in reducing the amounts of $H_2S$ and other contaminants in the produced water before it is injected back into the earth.

The treatment composition and process according to the third exemplary embodiment of the present invention have proven to be efficient and cost effective at completely remediating contaminants such as $H_2S$, $CO_2$, and metals etc. in gasses including natural gas, combustion gasses from fossil fuels which typically have high concentrations of $CO_2$ and $SO_2$, etc. Gasses that are treated using the alcohol treatment composition and process, including natural gas, are so clean that they may be directly, safely used by consumers without further treatment. Thus, for example, if the treatment process is carried out at or near a well from which the gas is extracted, the gas may be directly compressed into LPG at the same location using appropriate equipment, and as a further benefit of the treatment process transportation and storage costs for the treated natural gas may be greatly reduced once compressed into LPG.

Further, the inventor has determined that the treatment composition and treatment process according to the inventors' third discovery is particularly effective and efficient for completely remediating contaminants such as $H_2S$, $CO_2$, and metals, etc. in gasses when used in combination with an alkaline water wash according to the second exemplary embodiment of the present invention discussed herein. Used together in series, the treatment compositions/solutions and processes according to the second and third exemplary embodiments have proven to be very suitable and economically practical for treating contaminated gasses, including natural gas, in a continuous manner at high flow rate and regardless of the amounts of $H_2S$, $CO_2$ and other contaminant(s) in the contaminated gases. The alkaline water wash solution according the second embodiment is very effective at removing all of the salts and much of the other contaminants from the gasses at a relatively low cost. Even though this may require periodically or regularly replacing the alkaline water wash solution as it becomes spent or refortifying the alkaline water wash on a continuous basis, the alkaline water wash solution mostly contains water and alkaline substances such as hydroxide compound(s) which are relatively inexpensive. On the other hand, while the hydrocarbon liquid based treatment composition used in the treatment process according to the third embodiment may have a significantly higher cost/unit volume than the alkaline water wash solution, the amount of contaminants which are removed using such alcohol based treatment composition and process is relatively small in comparison to the amounts of contaminants that are initially removed by the alkaline water wash if the two treatment processes are performed together in series. When the treatment processes according to the second and third embodiments are performed in series, the hydrocarbon liquid based treatment composition can be used for removing all or most of the remaining contaminants from a much greater volume of contaminated gas before the hydrocarbon liquid based treatment composition is spent and must be replaced or refortified as compared to the alkaline water wash solution, which helps to keep the treatment processes practical and cost effective.

As an example, the inventor has determined that in relation to a natural gas stream continuously flowing in the amount of five to ten million ft$^3$/day containing about 30,000 ppm of each of $H_2S$ and $CO_2$, as well as significant amounts of other sulfur based contaminants including mercaptans and thiophenes, BTEX compounds, water vapor, salts, and metals, etc., such stream may be sufficiently treated to remove and/or remediate all of the contaminants therein down to safe, acceptable levels using two bubble tower reactors, one for the alkaline water wash and the other for the alcohol based treatment composition. Each of such reactors may be four (4) feet in diameter and twenty (20) feet tall, one containing about 1410 gallons of the alkaline water wash and the other containing about 1410 gallons of the alcohol based treatment composition, which will fill the lower fifteen (15) feet of each reactor leaving five (5) feet of head space. Again, the alkaline water wash is considered spent and should be replaced when the pH drops from an initial value of about 11 to a value between 9 and 8 which is typically about every hour, and the hydrocarbon liquid based treatment solution is considered spent and replaced when the pH drops from an initial value of 14 to a value between 10 and 9, which may be about every eight (8) to ten (10) hours under the discussed conditions.

Overall, the combination of the treatment compositions and processes according to the second and third embodiments of the present invention is very effective and efficient at removing and/or remediating contaminants from gasses, even highly contaminated gasses in a practical, cost-effective manner. Very significantly, even the natural gas which currently remains untapped or capped around the world for which there was no previously known cost-effective treatment process can be successfully treated using this combination of the inventors' second and third discoveries. Further, if the inventor's first discovery is initially used to treat a mixture of crude oil together with the natural gas, this will add further benefit and cost efficiency to the treatment of these fluids. Also, the combination of the treatment compositions and processes according to the inventor's second and third discoveries can be used effectively and economically for a carbon sequestration/mitigation strategy. For example, if a contaminated gas contains 80,000 ppm or more of $CO_2/CO$ such as natural gas stream or fossil fuel combustion gas from a power producing plant at a volume of 13 million ft$^3$/day, the combination of the treatment processes according to the second and third discoveries can remove 57,058 kg or 63 tons/day of $CO_2$ that might otherwise be released into the atmosphere. The alkaline water wash by itself, again, may remove most of the $CO_2$, and correspondingly could be used for a carbon sequestration/mitigation strategy and for acquiring valuable carbon credits.

Example of Contaminated Natural Gas Treated by a Combination of the Treatment Compositions and Processes According to the Second and Third Embodiments The inventor has treated a highly contaminated natural gas from a well using the treatment solutions/compositions and treatment processes according to the second and third exemplary embodiments of the invention discussed herein. The natural gas initially contained 60,000 ppm of $H_2S$ and about 160,000 ppm of $CO_2$, as well as several other contaminants including water, salts, other sulfur containing compounds such as mercaptans and thiophenes, BTEX chemical, and metals, and after being treated according to the second and third exemplary embodiments of the invention discussed herein, the treated natural gas was exceptionally free of the contaminants and ready for sale and safe use by consumers, as confirmed by analyzing the treated gas with a gas chromatograph (GC). As reflected in the GC analysis results, the raw gas had 58 peaks reflecting the desirable contents of the natural gas and the various contaminants. After being treated using an alkaline water wash according to the second embodiment of the present invention, which remediated and/or removed most of the contaminants, the treated gas had 61 peaks which is an increase from the 58 peaks of the raw gas and indicates that some of the components and/or contaminants in the raw were masked by other components in the raw gas and were unmasked by the treatment with the alkaline water wash solution. Finally, after being further treated using an alcohol based treatment composition and treatment process according to the third embodiment of the present invention, the treated gas had only 17 peaks essentially all of which pertain to desirable components of natural gas and show that the treated gas is extremely clean and safe to use. Again, such clean gas may be sold for direct, safe use by consumers, and may be compressed into LPG for further cost savings relating to storage and transportation of the clean gas.

An Overall Cost Effective Treatment Strategy for Crude Oil and Natural Gas From a Well While a combination of the treatment solutions/compositions and treatment process according to the second and third exemplary embodiments of the invention discussed herein are very effective for economically treating contaminated gasses such as natural gas as discussed above, if the inventor's first discovery is initially used to treat a mixture of crude oil together with the natural gas, this will add further benefit and cost efficiency to the treatment of these fluids. Referring to FIG. 4 herein, is a schematic diagram explaining how the different embodiments of the present invention may be used together for efficiently remediating contaminants from a mixed fluid stream such as a stream of crude oil and natural gas from a well. As shown, raw natural gas, crude oil and produced water (SWD) are extracted from a well 1 and flow into a 3-way separator 2 which separates these materials into three different output streams. The natural gas and crude oil streams may be recombined to flow together comingled in single pipeline 4, while the produced water SWD may be disposed of by being injected back into the earth. An appropriate dosage of a first treatment composition, such as any of those according to the inventors' previous proposals discussed in PCT/US2018/064015 and the '911 patent, may then be injected into the comingled stream of oil and gas in the pipeline 4 from a source of the composition 6 using a pump 5. After the comingled stream of oil and gas and treatment composition flow along the pipeline 4 for some distance or time such as one or more miles or 15-120 minutes, the crude oil is separated from the natural gas into two different streams, with the crude oil going to a treated oil tank battery 9 or other location and the natural gas continuing along for further remediation and removal of contaminants. At this point the contaminants in the crude oil have, including $H_2S$ and $CO_2$, been sufficiently or fully remediated by the first treatment composition injected into the pipeline 4, although the remediated contaminants remain in the crude oil without precipitating therefrom due to the organic acids such as fulvic acid and humic acid in the first treatment composition, but such remediated crude oil is readily accepted by refineries and pipelines flowing to refineries.

The natural gas stream has also had some of the contaminants therein partially removed and/or remediated by the first treatment composition injected into the pipeline 4, but still may contain a great deal of contaminants including salts, $H_2S$ and $CO_2$, etc. Then the natural gas is treated in an alkaline water wash solution contained in a first reaction chamber 7 such as bubble tower #1 according to the second exemplary embodiment of the present invention whereby most of the contaminants in the natural gas are remediated and/or removed by the alkaline water wash solution. Finally, the natural gas is treated using a second, alcohol based treatment composition in a second reaction chamber 8 such as bubble tower #2 according to the third exemplary embodiment of the present invention whereby all or essentially all of the contaminants remaining in the natural gas including $H_2S$ and $CO_2$ are remediated down to safe, government accepted levels and for most contaminants down to non-detectable levels, although the remediated contaminants remain in the natural gas without precipitating therefrom due to the organic acids such as fulvic acid and humic acid in the alcohol based treatment composition. At this point, the treated natural gas discharged from the second reaction chamber is very safe for direct use by consumers and/or for being compressed into LPG.

The foregoing description is given for clearness of understanding only, and no unnecessary limitations should be understood therefrom, as modifications within the scope of the invention may be apparent to those having ordinary skill in the art and are encompassed by the claims appended hereto.

We claim:

1. A treatment process for removing and/or remediating targeted contaminants in a contaminated gas, wherein the targeted contaminants are selected from a group consisting of $H_2S$, mercaptans, thiophenes, benzene, toluene, ethylbenzene, xylenes, $CO_2$, $SO_2$, metals, and salts, comprising 3 steps of: providing a volume of a treatment composition in a reaction chamber such that there is a head space above the treatment composition in the reaction chamber; bubbling or otherwise passing a flow of the contaminated gas through the treatment composition in the reaction chamber and into the head space to cause targeted contaminants in the contaminated gas to be remediated until the pH of the treatment composition drops to between 10 and 9; discharging the treatment composition from the reaction chamber; and repeating these steps wherein the treatment composition comprises a hydrocarbon based liquid; and at least one hydroxide compound dispersed or dissolved into the hydrocarbon based liquid, wherein the at least one hydroxide compound dispersed or dissolved into the hydrocarbon based liquid constitutes 30-50 wt. % of the treatment composition, the at least one hydroxide compound includes at least one of potassium hydroxide and sodium hydroxide, and a pH of the treatment composition is in a range of 13-14.0.

2. The treatment process according to claim 1 wherein the contaminated gas is controlled to have a collective contact time in a range of 0.5 to 10 seconds as it is bubbled or otherwise passed through the treatment composition and through the head space.

3. The treatment process according to claim 1, wherein steps are repeated until the pH of the treatment composition drops to between 10 and 9.

4. A treatment process for removing and/or remediating targeted contaminants in a contaminated gas, wherein the targeted contaminants are selected from a group consisting of $H_2S$, mercaptans, thiophenes, benzene, toluene, ethylbenzene, xylenes, $CO_2$, $SO_2$, metals, and salts, comprising steps of: preparing a liquid treatment composition containing water, at least one hydroxide compound and a hydrocarbon based liquid, wherein a pH of the treatment composition is at least 13.0 and the aqueous solution contains at least one of sodium hydroxide and potassium hydroxide; providing a volume of the liquid treatment composition in a reaction chamber such that there is a head space above the treatment composition in the reaction chamber; and bubbling or otherwise passing a flow of the contaminated gas through the treatment composition in the reaction chamber and into the head space to cause targeted contaminants in the contaminated gas to be remediated by the liquid treatment composition.

5. The treatment process according to claim 4, wherein the contaminated gas is controlled to have a collective contact time in a range of 0.5 to 10 seconds as it is bubbled or otherwise passed through the treatment composition and through the head space.

6. The treatment process according to claim 4, wherein the liquid treatment composition contains 50 volume % or less of water.

7. The treatment composition according to claim 4, further comprising at least one organic acid selected from the group consisting of fulvic acid and humic acid and the at least one organic acid constitutes 0.1-6.0 wt % of the treatment composition.

8. The treatment composition according to claim 4, further comprising a chelating agent and the chelating agent constitutes 0.1-5 wt % of the treatment composition.

* * * * *